US007777462B2

(12) United States Patent
Kudo et al.

(10) Patent No.: US 7,777,462 B2
(45) Date of Patent: Aug. 17, 2010

(54) POWER SUPPLY UNIT

(75) Inventors: Ryotaro Kudo, Tokyo (JP); Toshio Nagasawa, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 53 days.

(21) Appl. No.: 12/334,783

(22) Filed: Dec. 15, 2008

(65) Prior Publication Data

US 2009/0224732 A1     Sep. 10, 2009

(30) Foreign Application Priority Data

Mar. 7, 2008    (JP)    ............................. 2008-057496

(51) Int. Cl.
    *G05F 1/00*    (2006.01)
(52) U.S. Cl. ...................... 323/272; 323/901
(58) Field of Classification Search ................. 323/272, 323/901, 224, 283
    See application file for complete search history.

(56)                 References Cited

U.S. PATENT DOCUMENTS 6,806,689 B2    10/2004    Schuellein et al.
6,841,977 B2 *  1/2005     Huang et al. ................. 323/224
2007/0064456 A1 3/2007     Schuellein et al.

FOREIGN PATENT DOCUMENTS

| JP | 2005-520475 | 7/2005 |
|---|---|---|
| JP | 2007-135390 | 5/2007 |
| JP | 2008-017620 | 1/2008 |

* cited by examiner

*Primary Examiner*—Shawn Riley
(74) *Attorney, Agent, or Firm*—Mattingly & Malur, P.C.

(57)    ABSTRACT

To provide a power supply unit capable of realizing a multiphase power supply at low cost. For example, each of a plurality of semiconductor devices DEV[1]-DEV[n] comprises a trigger input terminal TRG_IN, a trigger output terminal TRG_OUT, and a timer circuit TM that delays a pulse signal input from TRG_IN and outputs it to TRG_OUT. DEV[1]-DEV[n] are mutually coupled in a ring shape by its own TRG_IN being coupled to TRG_OUT of one semiconductor device other than itself. Each of DEV[1]-DEV[n] performs switching operation by using the pulse signal from TRG_IN as a starting point, and feeds a current into an inductor L corresponding to itself. Moreover, DEV[1] generates the above-described pulse signal only once during startup by a start trigger terminal ST being set to a ground voltage GND, for example.

17 Claims, 13 Drawing Sheets

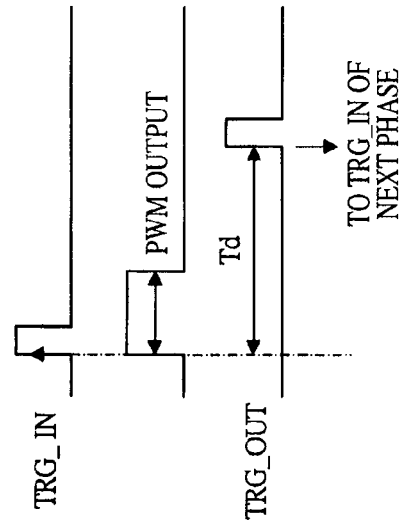
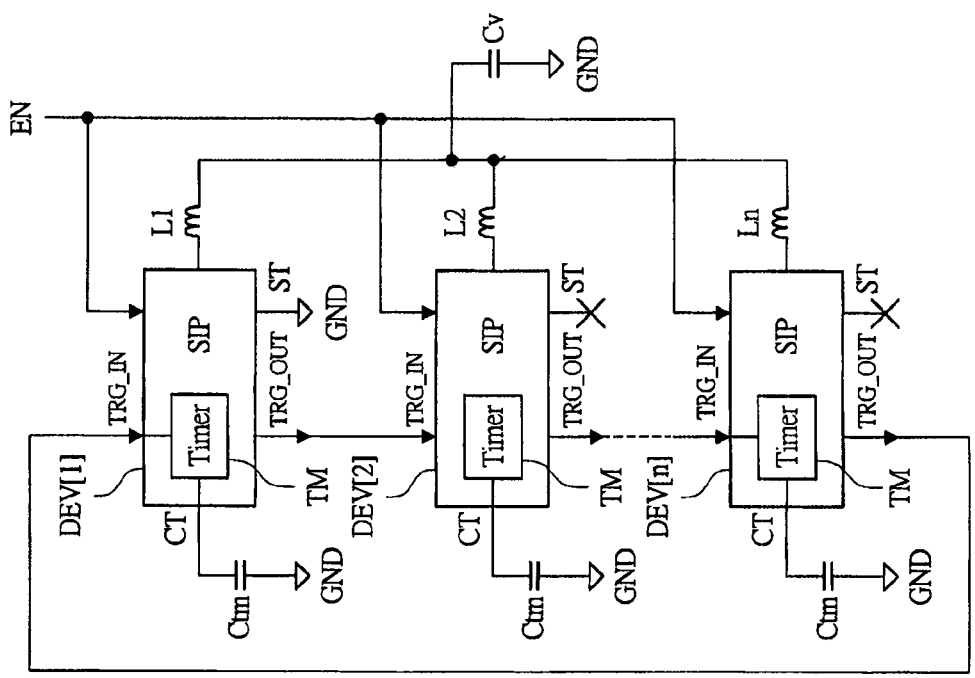

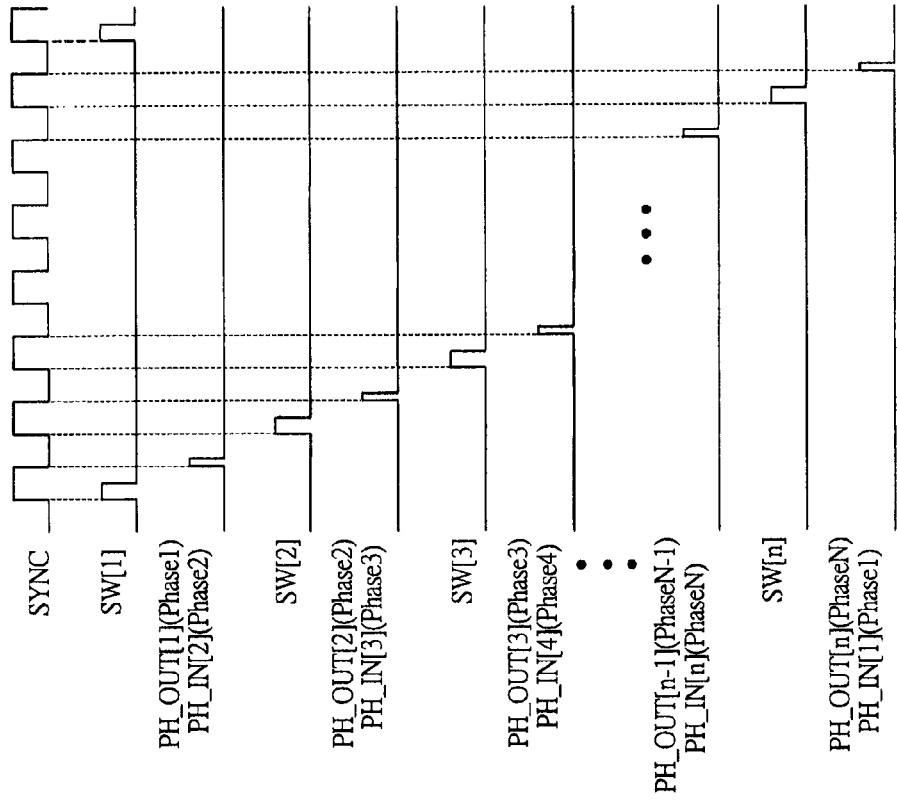
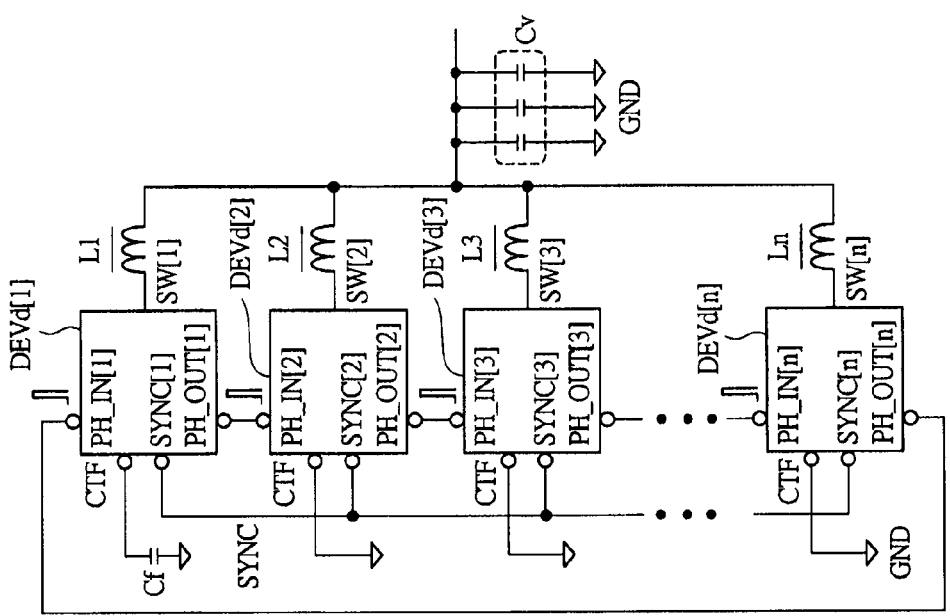

POWER SUPPLY UNIT

CROSS-REFERENCE TO RELATED APPLICATION

The present application claims priority from Japanese patent application No. 2008-57496 filed on Mar. 7, 2008, the content of which is hereby incorporated by reference into this application.

BACKGROUND OF THE INVENTION

The present invention relates to a power supply unit, and relates to, for example, a technique effective in application to a switching power supply unit that converts a high voltage into a low voltage.

For example, Patent document 1 (Japanese patent translation publication No. 2005-520475) describes a multiphase buck converter comprising: n inductors in parallel connection with a common capacitor; n output switching devices coupled to these inductors, respectively; n phase output devices that drive these output switching devices by PWM control, respectively; and a phase control device that supplies a common control signal to each of the phase outputting devices (FIG. 1). The phase control device supplies the n phase output devices with a phase timing signal such as a triangular waveform, and a PWM control signal for determining a PWM duty. This triangular waveform is determined by a voltage level different in each of the n phase output devices, and whereby a timing signal having n phases that differ for each of the n phase output devices is generated (FIG. 12d). Each of the n phase output devices drives, within its own phase, a corresponding output switching device by a PWM duty based on the above-described PWM control signal.

Moreover, Patent document 2 (Japanese patent laid-open No. 2007-135390) describes a multiphase converter comprising: n inductors in parallel connection with a common capacitor; n transistor pairs coupled to the inductors, respectively; n phase ICs that drive the transistor pairs by PWM control, respectively; a control IC that supplies a common control signal to each of the phase ICs (FIG. 1, FIG. 2). The control IC generates a clock signal, a phase-out signal (pulse signal), an error amplifier signal for determining the PWM duty, and the like. The first phase IC receives the phase-out signal as a phase-in signal from the control IC, delays it by one clock, and then outputs it to the second phase IC as a phase-out signal. The second phase IC receives the phase-out signal from the first phase IC as a phase-in signal, delays it by one clock, and then outputs it to the third phase IC as the phase-out signal. The following phase ICs performs the same operations, and finally, a phase-out signal from the n-th phase IC is fed back as the phase-in signal of the control IC. Each of the phase ICs drives a corresponding transistor pair by a PWM duty corresponding to the error amplifier signal, based on the timing of its own phase-in signal.

Moreover, Patent document 3 (Japanese patent laid-open No. 2008-17620) describes a semiconductor device, wherein a power MOSFET, a drive circuit that drives the same, and a control circuit that transmits a switching control signal to the driver circuit are incorporated into one package (FIG. 1, FIG. 2). This semiconductor device employs a peak current control method, in which the PWM duty is determined by the result of comparison between an error amplifier signal (criterion level) reflecting a detection voltage from an external capacitor coupled to the power MOSFET and a signal (ramp signal) obtained by detecting a current flowing through the power MOSFET and converting it into a voltage (FIG. 8, FIG. 9).

Moreover, this semiconductor device contains an oscillator circuit, and can share the output of this oscillator circuit, the above-described error amplifier signal, and the like with other semiconductor devices via external terminals (FIG. 17).

Moreover, non-Patent Document 1 ("ISL6327 Data Sheet", [online], [Searched on Feb. 12, 2008], Internet <URL: http://www.intersil.com/data/fn/FN9276.pdf>) describes a six-phase buck converter comprising: six inductors in parallel connection with a common capacitor; six transistor pairs coupled to the inductors, respectively; six driver ICs that drive the transistor pairs, respectively, by PWM control; and a control IC that controls each of the driver ICs. The control IC includes: six pairs (of positive side and negative side) of external input terminals for detecting currents flowing through the six inductors, respectively; six external output terminals for supplying a PWM signal having a different phase to six driver ICs, respectively; a plurality of external input terminals for externally setting the setting voltage of the common capacitor; and the like.

SUMMARY OF THE INVENTION

For example, various electronic equipment and electric appliances represented by a personal computer (hereinafter, referred to as PC) and the like are equipped with an AC/DC converter (e.g., ATX power supply) that generates a desired DC voltage (e.g., 12 V, 5 V, 3.3 V, etc.) from an alternating voltage (e.g., 100 V, etc.) serving as a commercial power source. Moreover, in a note type PC etc., a DC voltage of a specific value is supplied by a battery. For example, in various semiconductor components used in PC or the like, a stable power supply voltage is required, and a plurality of power supply voltage values is required depending on circumstances. Therefore, the voltage generated by this AC/DC converter or a battery is converted into specified voltages and stable voltages by a step-down type DC/DC converter (buck converter), to be supplied to various semiconductor components. These are typically referred to as a POL (point of load) converter or the like, and for example, in the case of PC, these are mounted in the vicinity of various information units (CPU (Central Processing Unit), GPU (Graphics Processing Unit), a memory, or the like) on a mother board or on various expansion boards (graphics board and the like).

In such a buck converter, a switching-type buck converter providing a high power-efficiency is typically used. If the switching type is used, then a reduction in the ripple voltage generated by switching, support for higher current, and the like become important. That is, for the latter case, as the amount of load current increases, the associated on-resistance related power loss and heat generation and the like of the switching transistor cannot be neglected. In order to solve such problems, for example, as described in Patent Documents 1, 2, and non-Patent Document 1, a multiphase technique is advantageously used, in which a plurality of inductors is in parallel connection with a common capacitor, and a current is fed through each of the inductors in a different phase. If the multiphase technique is used, then, in principle, the more the number of phases, the further the ripple voltage will be reduced. Moreover, since the amount of load current may be supplied in a distributed manner from each inductor (each switching transistor), coping with higher current becomes easy. Moreover, since the inductor's value can be reduced, a higher speed can be also achieved.

However, if the techniques of Patent Documents 1, 2, and non-Patent Document 1 are used, it is necessary to always provide a master IC (the phase control device of Patent Document 1, the control IC of Patent Document 2, the control IC of non-Patent Document 1) and to couple a plurality of slave ICs thereto. Therefore, a lower cost cannot be achieved in terms of the mounting area, the IC cost, and the like. For example, in realizing a multiphase power supply having fewer phases than six phases by using the technique of non-Patent Document 1, the circuits and the like for realizing the remaining phases will be wasted. On the other hand, for example, if the techniques of Patent Documents 1, 2 are used, slave ICs corresponding to the number of phases desired to realize may be provided, however, a master IC always needs to be additionally provided. Therefore, especially the fewer the number of phases to realize, the further the cost performance will decrease. In particular, since the mounting area is limited in a notebook PC or various mobile computing devices, the interconnect wires for the mounted component and between the mounted components are preferably reduced as much as possible.

It is thus one of the objects of the present invention to provide a power supply unit capable of realizing a multiphase power supply at low cost. In addition, the above-described object and other objects and the novel features of the present invention will be apparent from the description of the present specification and the accompanying drawings.

The overview of a representative embodiment of the invention disclosed in the present application will be described briefly as follows.

A power supply unit according to an embodiment of the present invention comprises a plurality of semiconductor devices, a plurality of inductors coupled to these semiconductor devices, respectively, and an output capacitor commonly coupled to these inductors. Each of the semiconductor devices includes: a first input terminal; a first output terminal; a first circuit that delays a trigger pulse signal input from the first input terminal and transmits it to the first output terminal; and a control circuit that carries out switching control of a built-in transistor by using this trigger pulse signal as a starting point and supplies a current to a corresponding inductor. These semiconductor devices are characterized in that they are mutually coupled in a ring shape by the first output terminal of itself being coupled to the first input terminal of any one of the semiconductor devices other than itself, and whereby the multiphase power supply operation is performed.

If such a configuration is used, a master IC as in the prior art needs not to be provided, and therefore the multiphase power supply operation can be realized at low cost. Note that, more specifically, in order to realize the multiphase power supply operation with such a configuration, any one of a plurality of semiconductor devices needs to generate a trigger pulse signal only once during startup, for example. Then, each of the semiconductor devices includes a function to generate the trigger pulse signal during the startup depending on setting from the outside. This setting from the outside may be carried out depending on, for example, whether or not an external resistor is coupled to the first input terminal or the first output terminal. This can reduce the number of terminals as compared with the case where a dedicated terminal is provided separately, and thus a low cost can be achieved.

Moreover, preferably each semiconductor device described above includes an error amplifier circuit for setting the switching time of a transistor, and further includes a second output terminal that outputs an error amplifier signal from this error amplifier circuit, and a second input terminal that can also receive an error amplifier signal from other than itself. This allows, for example, any one of the semiconductor devices to generate an error amplifier signal and allows other semiconductor devices to share this error amplifier signal. Since this can reduce the number of wirings and the like, a lower cost can be achieved, and moreover, since the setting criterion of the switching time in each of the semiconductor devices is the same, a switching control having a small variation for each phase can be carried out. In addition, in particular, if a peak current control method is used in carrying out this switching control, the current for each phase can be equalized easily, which is beneficial. In this case, furthermore, by detecting a current for each phase by the current of a transistor within each semiconductor device, the number of wirings and the like can be reduced as compared with the case where the current of an inductor is detected, and thus a lower cost can be achieved.

Moreover, the power supply unit according to one embodiment of the present invention further comprises one semiconductor device used for monitoring and setting, in addition to the semiconductor device as described above. This monitoring and setting semiconductor device includes, for example, an error amplifier circuit as described above and a plurality of first setting terminals for setting the voltage value of the output capacitor. In this case, this error amplifier circuit generates an error amplifier signal based on the detection voltage of the output capacitor and the information on these first setting terminals. Then, this error amplifier signal is input from the second input terminal of a plurality of semiconductor devices as described above, and is shared by the semiconductor devices. Since the first setting terminals usually have many terminals, these terminals are separately assigned to another semiconductor device, and thereby a low cost power supply unit as a whole can be realized. Note that, for example, the so-called droop function or the like can be incorporated in such a monitoring and setting semiconductor device.

To briefly describe the effect obtained by the representative invention among the inventions disclosed in the present application, multiphase power supplies can be realized at low cost.

BRIEF DESCRIPTION OF THE DRAWINGS

FIGS. 1(a) and 1(b) show a basic concept of a power supply unit according to Embodiment 1 of the present invention, wherein FIG. 1(a) is a schematic diagram showing a configuration example thereof, and FIG. 1(b) is an explanatory view showing an operation example of FIG. 1(a).

FIGS. 7(a) and 7(b) show the details of a timer circuit in the semiconductor device of FIG. 4, wherein FIG. 7(a) is a circuit diagram showing a configuration example thereof, and FIG. 7(b) is a waveform chart showing an operation example thereof.

FIGS. 10(a) and 10(b) show a basic concept of a power supply unit according to Embodiment 4 of the present invention, wherein FIG. 10(a) is a schematic diagram showing a configuration example thereof, and FIG. 10(b) is an explanatory view showing an operation example of FIG. 10(a).

FIGS. 11(a) to 11(c) show an example around a phase input signal and a phase output signal in the semiconductor device of FIGS. 10(a) and 10(b), wherein FIG. 11(a) is a schematic configuration diagram of a master device, FIG. 11(b) is a schematic configuration diagram of a slave device, and FIG. 11(c) is an explanatory view showing an operation example thereof.

DETAILED DESCRIPTION OF THE PREFERRED EMBODIMENTS

Figure 2:
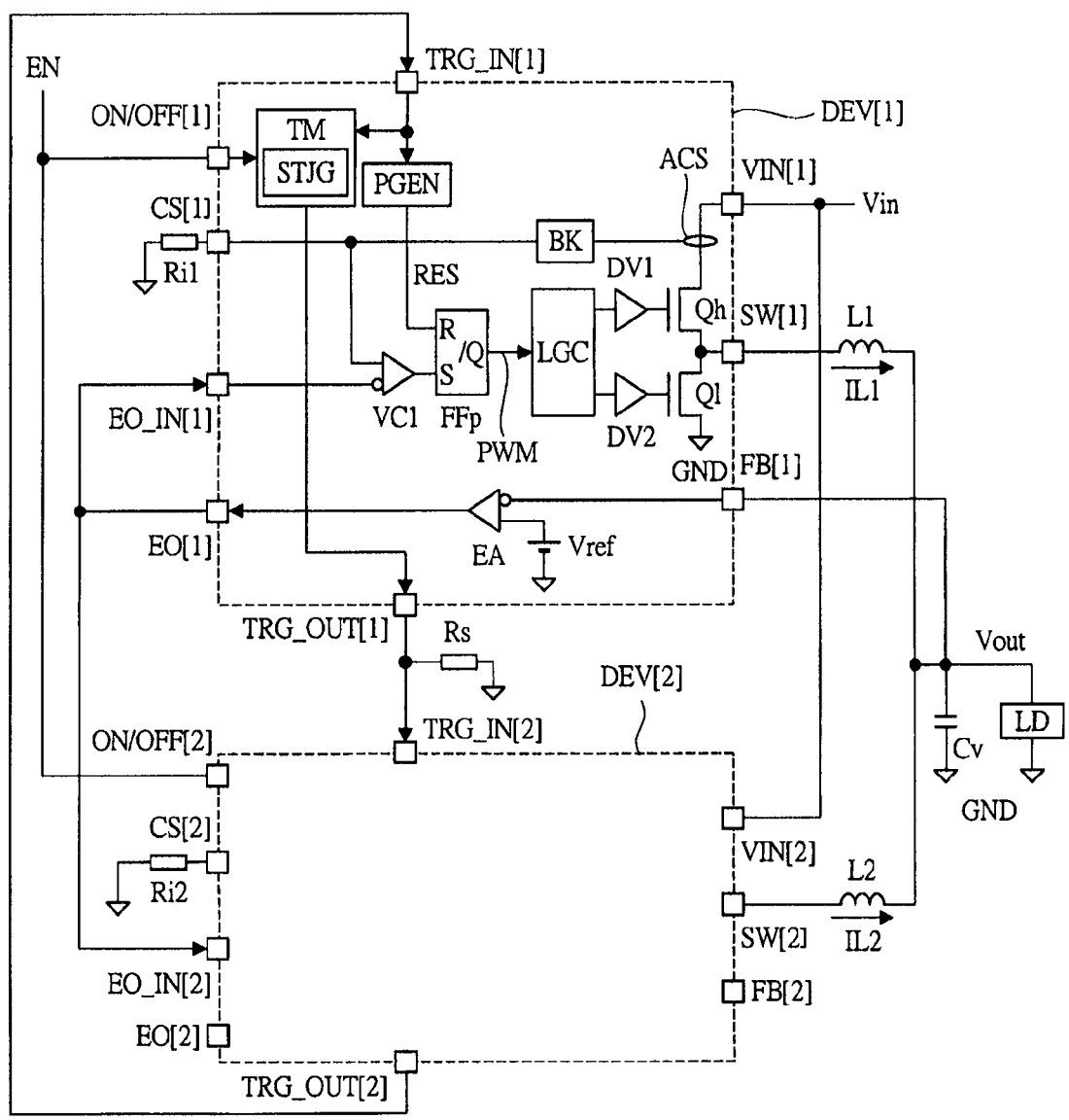
FIG. 2 is a block diagram showing a detailed configuration example in the power supply unit of FIG. 1.

Hereinafter, the embodiments of the present invention will be described in detail with reference to the accompanying drawings. In all the drawings for describing the embodiments, the same member is given the same reference symbol and numeral, in principle, to omit the duplicated description thereof. Moreover, in the following embodiments, when required for convenience's sake, the description is made by dividing the embodiment into a plurality of sections or embodiments, however, unless otherwise stated, those are not the mutually-unrelated ones, but one of them is a variation of a part of or all of the other, or the detailed or supplementary description of the other.

Moreover, in the following embodiments, when referring to the number and the like (including the number of pieces, the numerical value, the amount, the range, or the like) of an element, except, for example, when specially stated and when apparently limited to a specific number in principle, the number of the elements is not limited to the specific number, but may be no less and no more than the specific number. Furthermore, in the following embodiments, except, for example, when specially stated and when considered to be apparently indispensable in principle, the constituent elements thereof (including elements, steps, and the like) are not necessarily indispensable ones, of course. Similarly, in the following embodiments, when referring to the shape, the positional relationship, and the like of a constituent element or the like, except, for example, when specially stated and when considered to be apparently not true in principle, the ones that approximate or are substantially similar to this shape or the like shall be included. This is also true of the above-described numerical value and range.

Embodiment 1

FIGS. 1(a) and 1(b) show a basic concept of a power supply unit according to Embodiment 1 of the present invention, wherein FIG. 1(a) is a schematic diagram showing a configuration example thereof, and FIG. 1(b) is an explanatory view showing an operation example of FIG. 1(a). The power supply unit shown in FIG. 1(a) has a configuration for realizing a multiphase power supply of n (n>=2) phases, and comprises n semiconductor devices (or semiconductor ICs) DEV[1]-DEV[n], n inductors L1-Ln, an output capacitor Cv, and the like.

Each of DEV[1]-DEV[n] comprises a trigger input terminal TRG_IN, a trigger output terminal TRG_OUT, and a timer circuit TM. TM receives a signal of TRG_IN as an input, and delays it based on a capacitor Ctm coupled to a delay time setting terminal CT, and outputs the delayed signal from TRG_OUT. Note that, an analog delay based on the capacitor Ctm is used here, but not limited thereto, and this can be replaced with various kinds of generic delay circuits, such as a digital delay using, for example, a flip-flop circuit, a counter circuit, or the like.

TRG_IN and TRG_OUT of each of the semiconductor devices DEV[1]-DEV[n] are coupled in a ring shape as a whole by TRG_OUT of a certain semiconductor device being coupled to TRG_IN of other semiconductor device. That is, TRG_OUT of DEV[k] ($1 \leq k \leq (n-1)$) serving as a preceding stage is coupled to TRG_IN of DEV[k+1] serving as the subsequent stage, and TRG_OUT of DEV[n] serving as the final stage is coupled to TRG_IN of DEV[1] serving as the forefront stage. For inductors L1-Ln, one end each thereof is coupled to each of DEV[1]-DEV[n], and the other end each thereof is commonly coupled to one end of the output capacitor Cv. Moreover, DEV[1] to DEV[n] perform operation when an enable signal EN is being activated.

In such a configuration, each of DEV[1]-DEV[n], as shown in FIG. 1(b), performs PWM (Pulse Width Modulation) operation by using an input signal to its own TRG_IN as a starting point, and supplies a current to an inductor corresponding to itself. Therefore, DEV[1] performs PWM operation, and then after a delay time (denoted by Td) based on TM has elapsed, DEV[2] performs PWM operation, and the following DEV's performs the same operation. Then, DEV[n] performs PWM operation and after Td has elapsed, DEV[1] will perform PWM operation again. Thus, a multiphase power supply operation of n phases can be realized at a switching frequency $f (=(Td \times n)^{-1})$ [Hz].

Incidentally, in such a ring coupled loop system, once a pulse signal is input, this pulse signal will automatically circulate thereafter, however, this first time pulse signal has to be generated in some form. Then, in the configuration example of FIG. 1(a), DEV[1] sets a start trigger terminal ST to a fixed voltage (here, a ground voltage GND) to generate the pulse only once during activation of the enable signal EN. By setting ST to be open, for example, other DEV[2]-DEV[n] will not generate this first time pulse signal.

As described above, if the power supply unit as shown in FIG. 1 is used, a separate master IC is not required unlike in the prior art and a multiphase power supply having n phases can be realized using n semiconductor devices. Thus, a lower cost of the power supply unit can be achieved in terms of the cost of the semiconductor device itself, the implementation cost, and the like. Moreover, this also can achieve simplicity of design of the power supply unit, as compared with the prior art. That is, if a master IC is used, it is necessary to provide the master IC and n slave ICs, which are compatible with each other, and to extend n wirings to the n slave ICs from the master IC in principle, and therefore, a relatively complicated design (wiring design and the like) will be needed. On the other hand, in the power supply unit of FIG. 1, the semiconductor devices in the number of phases desired to realize may be provided and then TRG_OUT of a certain semiconductor device may be coupled to TRG_IN of other semiconductor device on a one-to-one basis, and therefore, the design is easy. Furthermore, the semiconductor device in the power supply unit of FIG. 1 can operate by itself by coupling its own TRG_IN to its own TRG_OUT, and can be used also as a single phase power supply. These allow you to flexibly respond when you desire to construct power supply units having various numbers of phases, and also allow you to realize these units easily and at low cost.

Figure 3:
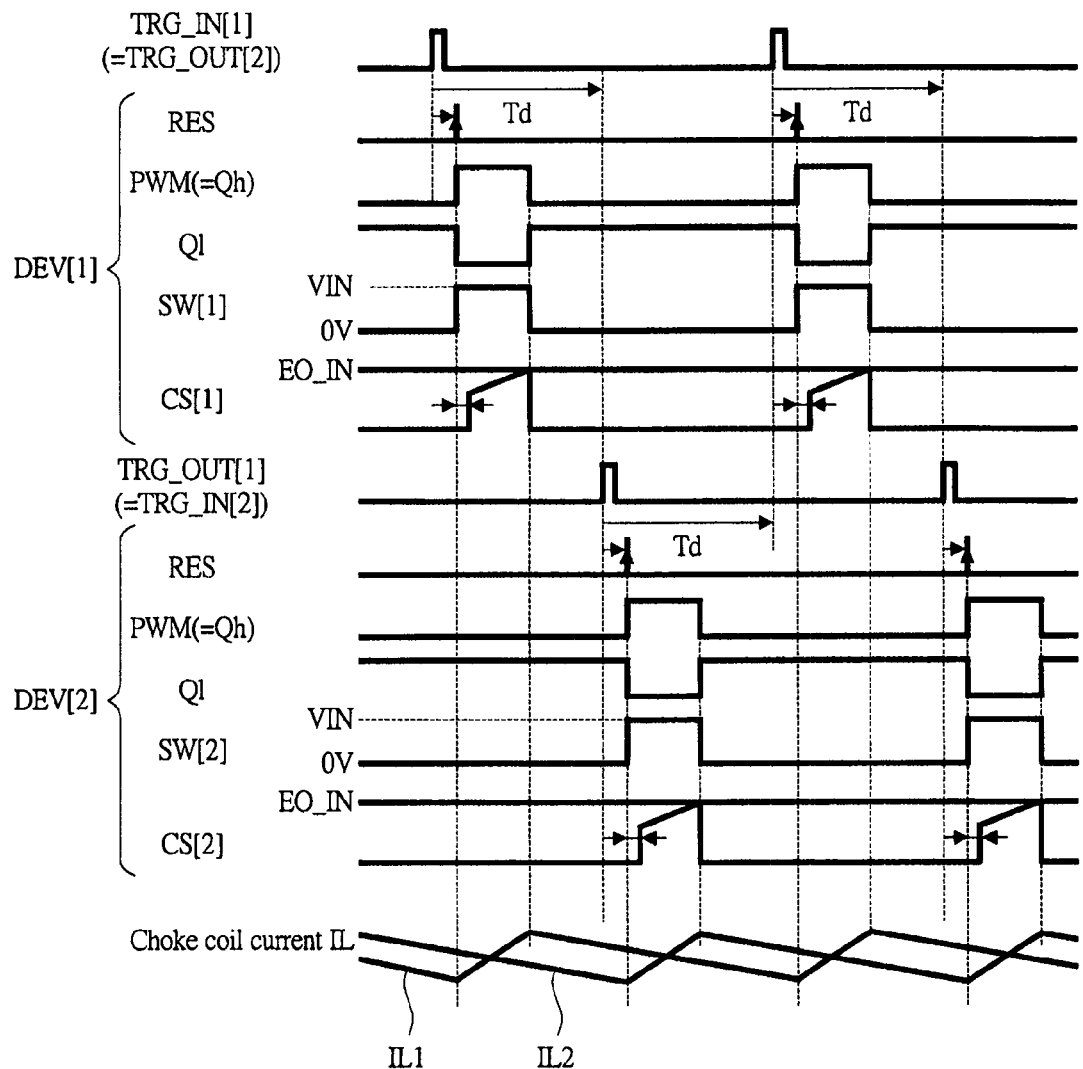
FIG. 3 is a waveform chart showing an operation example of the power supply unit of FIG. 2.

FIG. 2 is a block diagram showing a detailed configuration example in the power supply unit of FIG. 1. FIG. 3 is a waveform chart showing an operation example of the power supply unit of FIG. 2. The power supply unit shown in FIG. 2 is an example in realizing a multiphase power supply having two phases, and it further shows a configuration example of the main part in the semiconductor device DEV. Each of the semiconductor devices DEV[1], [2] shown in FIG. 2 performs the PWM operation called a peak current control method as shown in Patent Document 3 described above.

DEV[1] comprises nine external terminals. ON/OFF[1] is a device operation enable setting terminal, CS[1] is a current sensing terminal (current sense signal), EO_IN[1] is an error amplifier input terminal, and EO[1] is an error amplifier output terminal. Moreover, TRG_IN[1] is a trigger input terminal (trigger input signal), and TRG_OUT[1] is a trigger output terminal (trigger output signal). Furthermore, VIN[1] is a power supply voltage input terminal, SW[1] is a switch terminal, and FB[1] is an output power supply voltage detection terminal. Similarly, DEV[2] comprises nine external terminals (ON/OFF[2], CS[2], EO_IN[2], EO[2], TRG_IN[2], TRG_OUT[2], VIN[2], SW[2], and FB[2]).

The enable signal EN is input to ON/OFF[1], [2]. Current sensing resistors Ri1, Ri2 are coupled to CS[1], CS[2], respectively. EO[1] is coupled to each of EO_IN[1] and EO_IN[2]. TRG_OUT[1] is coupled to TRG_IN[2], and TRG_OUT[2] is coupled to TRG_IN[1]. Moreover, a start triggering resistor Rs is coupled to TRG_OUT[1]. An input power supply voltage Vin is input to VIN[1], [2]. SW[1] is coupled to one end of the output capacitor Cv via an inductor L1, and SW[2] is coupled to one end of Cv via an inductor L2. The voltage at this one end of Cv serves as an output power supply voltage Vout, and this Vout serves as the power supply voltage for a specified loads LD, such as CPU. Moreover, this Vout is also input to FB[1].

Each of the semiconductor devices DEV[1], [2] comprises a timer circuit TM, a pulse generation circuit PGEN, a comparator circuit VC1, a flip-flop circuit FFp, an error amplifier circuit EA, a current detection circuit ACS, a blanking circuit BK, a control logic circuit LGC, driver circuits DV1, DV2, transistors Qh, Ql, and the like. To describe DEV[1] as an example, PGEN outputs a reset signal RES upon receipt of a trigger input signal from TRG_IN[1]. FFp receives RES at the reset input, receives an output of VC1 at the set input, and outputs a PWM signal from (/Q). Upon receipt of this PWM signal, LGC drives the gate of Qh via DV1 and drives the gate of Ql via DV2.

For Qh, the drain is coupled to VIN[1] and the source is coupled to SW[1]. For Ql, the drain is coupled to SW[1] and the source is coupled to the ground voltage GND. ACS detects a current flowing in the drain of Qh, and masks this current by BK for a specified period, and then outputs this to CS[1]. Since the resistor Ri1 is coupled to CS[1], this detected current is converted into a voltage at CS[1]. Moreover, EA compares the output power supply voltage Vout detected at FB[1] with a reference voltage Vref to generate an error amplifier signal serving as the criterion for the PWM duty. This error amplifier signal is again input from EO_IN[1] via EO[1]. Then, VC1 compares the current amount detected at CS[1] on the basis of the error amplifier signal of the EO_IN[1], and transmits this result to the set input of FFp.

On the other hand, the trigger input signal from TRG_IN[1] is transmitted also to the timer circuit TM. The timer circuit TM delays this trigger input signal by a specified delay time Td, and then outputs it from TRG_OUT[1]. Furthermore, TM comprises a start trigger determining circuit STJG. This STJG determines whether the start triggering resistor Rs is coupled to TRG_OUT[1]. If it is coupled, then when the enable signal EN is input via ON/OFF[1], TM generates a pulse signal only once and outputs it from TRG_OUT[1]. Note that, STJG of DEV[2] will not generate this pulse signal because Rs is not coupled to its own TRG_OUT[2].

The power supply unit of FIG. 2 performs the operation as shown in FIG. 3. First, DEV[1] generates the reset signal RES upon receipt of the trigger input signal from TRG_IN[1]. Next, with this RES, Qh is driven to 'H' level (i.e., turned on), and Ql is driven to 'L' level (i.e., turned off). Note that, actually, a dead time needs to be provided during the switching-over timing of Qh and Ql, however, the dead time is omitted here. When Qh is driven to be turned on, the input power supply voltage Vin from VIN[1] is delivered to SW[1].

Since this voltage of SW[1] is applied to the inductor L1, a ramp waveform current that rises at a specified inclination flows through Qh. This current is converted into a voltage at CS[1]. Here, by the blanking circuit BK of FIG. 2, a constant mask time is provided until a voltage is generated at CS[1] after turning on of Qh. This is for preventing a malfunction due to the detection of a spike current associated with the switching. This spike current is associated with the recovery current of a body diode coupled to Ql, although not illustrated. When this voltage at CS[1] reaches the voltage level of the error amplifier signal input from EO_IN[1], DEV[1] drives Qh to 'L' level (i.e., turn off) and drives Ql to 'H' level (i.e., turn on). When Ql is turned on (Qh is turned off), the current will continue to flow through L1 in a path via this Ql by an energy stored in L1. As a result, a current IL1 flowing through the inductor L1 rises at a specified inclination when Qh is turned on (Ql is turned off), and decreases at a specified inclination when Ql is turned on (Qh is turned off).

Moreover, when the trigger input signal is input from TRG_IN[1], DEV[1] will add a delay time Td thereto and output it from TRG_OUT[1]. The trigger output signal from this TRG_OUT[1] is input to TRG_IN[2] as the trigger input signal of DEV[2]. Upon receipt of the trigger input signal from this TRG_IN[2], DEV[2] generates the reset signal RES and then performs the same operations as in the case of DEV[1] described above. Further, DEV[2] outputs a trigger output signal from TRG_OUT[2], as DEV[1] does, then this is input to TRG_IN[1] as the trigger input signal of DEV[1], and whereby the operations as described above will be repeated.

As a result of such operation, a current IL2 of the inductor L2 is generated a half cycle delayed from the current IL1 of the inductor L1 described above. The output capacitor Cv generates a specified output power supply voltage Vout upon receipt of these IL1 and IL2, and the load LD performs a desired operation with this Vout as the power supply voltage and these IL1 and IL2 as the power supply current. Although not limited in particular, the input power supply voltage Vin is 12 V, the output power supply voltage Vout is 1.2 V, each of IL1 and IL2 is several tens of amperes, and so on.

In this way, the power supply unit of FIG. 2 comprises a feedback loop that monitors and feeds back the input current IL, in addition to a feedback loop for feeding back the output power supply voltage Vout, and whereby a peak current of the input current IL is controlled based on the error amplifier signal (determination level) generated by this voltage feedback loop. If such a peak current control method is used, as described in Patent Document 3, the unstable factors in the feedback loop system can be eliminated to simplify the phase compensation, and it is also possible to rapidly respond to a fluctuation in the output power supply voltage Vout associated with the load LD.

Moreover, in the power supply unit of FIG. 2, the error amplifier signal generated by the error amplifier circuit EA of DEV[1] is shared via EO_IN[1] and EO_IN[2] by DEV[1] and DEV[2]. In the multiphase power supply, a well-balanced stable power supply can be realized by further equalizing the current fed in each phase. For example, in the case where each of DEV[1] and DEV[2] generates its own error amplifier signal (determination level) using its own EA, a slight variation may occur in the determination level due to the process fluctuation or the like. On the other hand, in the power supply unit of FIG. 2, since this determination level is unified, further equalization of the current IL1 and the current IL2 can be achieved.

Furthermore, by constructing a multiphase power supply using the semiconductor devices described in FIG. 2, a reduction in the number of wirings can be achieved further as the number of phases increases. That is, for example, in Patent Documents 1, 2, and non-Patent Document 1 described above, since a current is detected by providing n pairs of wirings from a master IC or a slave IC with respect to n inductors for n phases, the number of wirings increases further as the number of phases increases. On the other hand, in the power supply unit of FIG. 2, since the current is detected within each of the semiconductor devices DEV[1], [2], such wiring is not required. Thus, in conjunction with various effects described in FIG. 1, the power supply unit of FIG. 2 may have a suitable configuration in realizing a multiphase power supply. Note that, an example of two phases is shown here, however, it can be easily understood that in even three or more phases, the configuration and operation will be the same and the same effects can be obtained.

As described above, typically, a low cost multiphase power supply can be realized by using the power supply unit of Embodiment 1.

Embodiment 2

Figure 4:
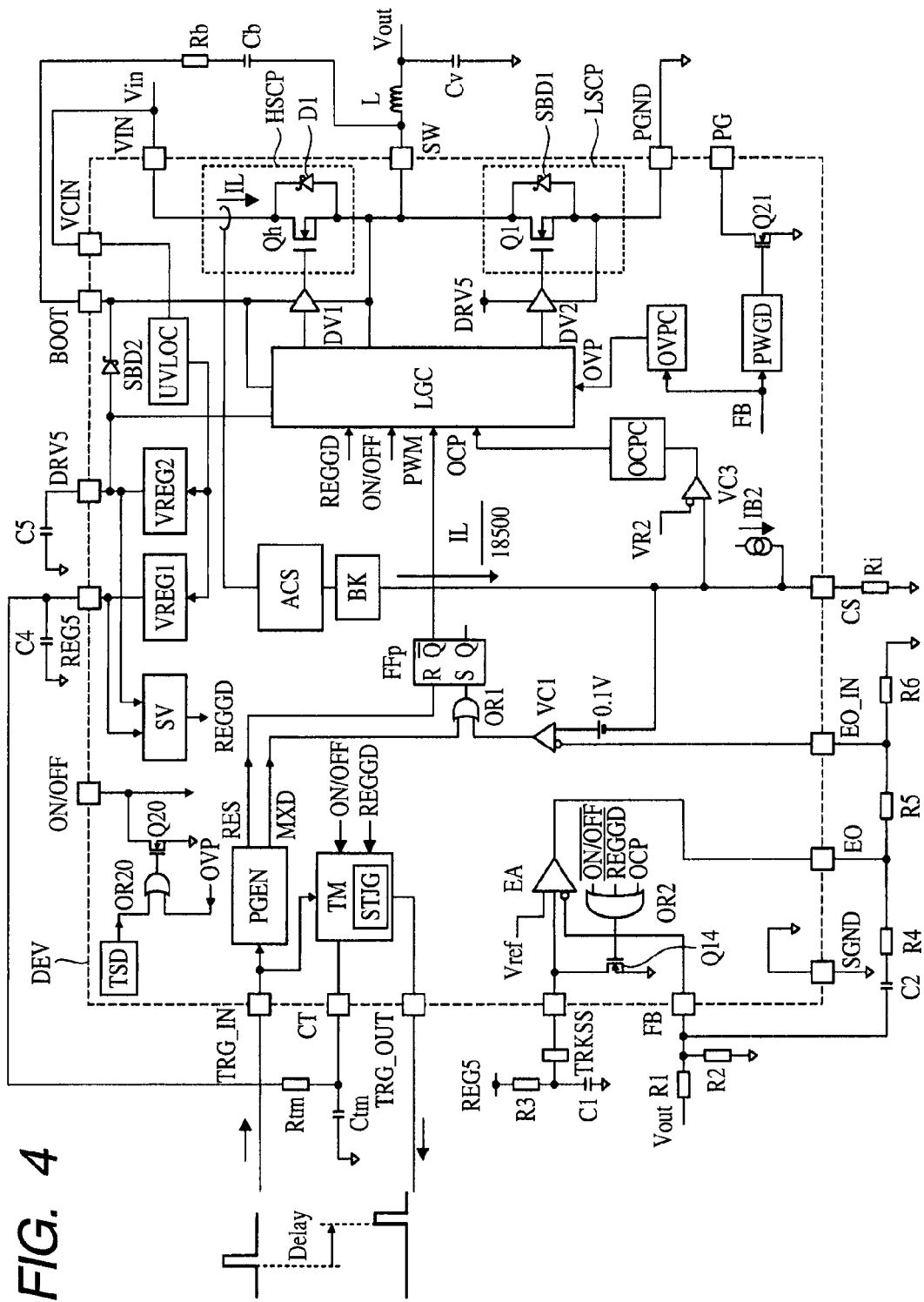
FIG. 4 is a block diagram showing a detailed configuration example of a semiconductor device used in a power supply unit according to Embodiment 2 of the present invention.
Figure 5:
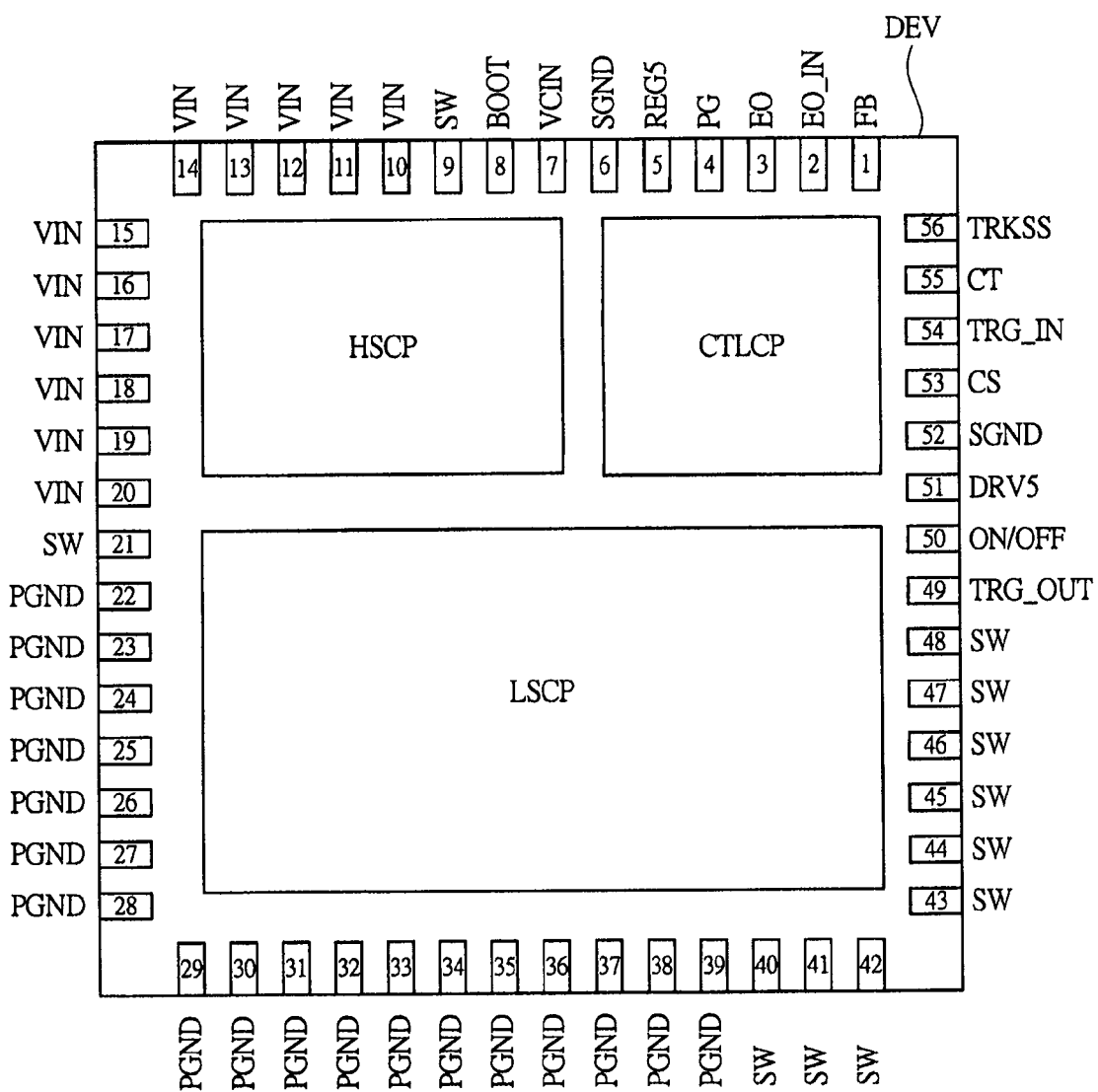
FIG. 5 is a plan view showing an example of a package form of the semiconductor device of FIG. 4.

In Embodiment 2, a more detailed configuration example of the semiconductor device DEV described in Embodiment 1 is described. FIG. 4 is a block diagram showing a detailed configuration example of a semiconductor device used in a power supply unit according to Embodiment 2 of the present invention. FIG. 5 is a plan view showing an example of the package form of the semiconductor device of FIG. 4. The configuration example shown in FIG. 4 is a further embodied one of the configuration example of FIG. 2 described above, and the general configuration and operation thereof are the same as those of FIG. 2 and FIG. 3. Here, the description is made paying attention to the portions further embodied from the configuration example of FIG. 2.

The semiconductor device (or a semiconductor IC) DEV shown in FIG. 4 basically comprises the transistor Qh serving as a high side transistor (e.g., MOSFET), the transistor Ql serving as a low side transistor (e.g., MOSFET), and various control circuits that control these transistors. A diode D1 is provided between the source and drain of Qh, and a Schottky diode SBD1 is provided between the source and drain of Ql. By providing this SBD1, a voltage drop in a current path on the Ql side especially during the dead time until Ql is turned on after Qh is turned off can be reduced.

As shown in FIG. 5, the transistor Qh and the diode D1 are formed on a semiconductor chip HSCP, the transistor Ql and the Schottky diode SBD1 are formed on a semiconductor chip LSCP, and various other control circuits are formed on a semiconductor chip CTLCP. That is, the semiconductor device DEV shown in FIG. 5 is a multichip module SiP (System in Package) or an MCM (Multi Chip Module), wherein three semiconductor chips are mounted in one package. Although not limited in particular, this semiconductor device DEV is realized by an 8 mm×8 mm QFN (Quad Flat Non-leaded package) provided with 56 external terminals, for example.

Within this package, LSCP is mounted in a region of approximately a half the mounting area, and HSCP and CTLCP are mounted in regions of the approximately remaining area, respectively. That is, the transistor area of the low side transistor Ql is designed so as to be two times as large as the transistor area of the high side transistor Qh. As described in FIG. 2 and FIG. 3, for example, in converting the input power supply voltage Vin of 12 V to the output power supply voltage Vout of 1.2 V, the time to turn on Ql becomes longer than that to turn on Qh. Therefore, by increasing the transistor area of Ql, the on resistance can be reduced to increase the power efficiency of the power supply unit. Moreover, although the details are shown in FIG. 4, various external terminals coupled to Qh are arranged around HSCP, various external terminals coupled to Ql are arranged around LSCP, and external terminals of various control signals for controlling Qh and Ql are arranged around CTLCP.

In FIG. 4, for Qh, the drain is coupled to a power supply voltage input terminal VIN and the source is coupled to a switch terminal SW, while for Ql, the drain is coupled to SW and the source is coupled to a ground voltage terminal PGND. This PGND serves as the terminal exclusively for Qh, Ql, and is provided separately from the ground voltage of various control circuits and the like so as not to provide switching noise to the various other control circuits and the like. The output capacitor Cv is coupled to SW via an inductor L, and this voltage of Cv serves as the output power supply voltage Vout.

The current detection circuit ACS, although not illustrated, is realized, for example, by forming a transistor having a size of $1/18500$ that is current-mirror coupled to the transistor Qh within HSCP. Then, letting the current of Qh be denoted by IL, a current of IL/18500 detected by this ACS is supplied to the current sensing terminal (current sense signal) CS via a mask period (e.g., several tens of ns) provided by the blanking circuit BK. A current detecting external resistor Ri is coupled to CS, and whereby a current is converted to a voltage. Note that a bias current source IB2 for stabilizing the operation is coupled to CS.

The driver circuits DV1, DV2 drive Qh, Ql under the control from the control logic circuit LGC, respectively. The input power supply voltage Vin is supplied to a power supply terminal VCIN as well as to the power supply voltage input terminal VIN. The power supply voltage from this VCIN is supplied to regulator circuits VREG1, VREG2 via a voltage detection circuit UVLOC. The voltage detection circuit UVLOC detects that the input power supply voltage is no less than a specified voltage, and if so, it enables the operation of VREG1, VREG2. VREG1, VREG2 generate such an internal power supply voltage of about 5 V upon receipt of such an input power supply voltage of 12 V. VREG1 supplies the generated internal power supply voltage to the various control circuits and also outputs it to an internal power supply terminal REG5. VREG2 supplies the generated internal power supply voltage to DV1, DV2, and the like and also outputs it to an internal power supply terminal DRV5. Voltage stabilizing capacitors C4, C5 are coupled to the internal power supply terminals REG5, DRV5, respectively.

Here, since the driver circuits DV1, DV2 drive Qh and Ql, they require a relatively large current and generate a lot of noises. On the other hand, since the various other control circuits include therein a number of analog circuits, such as a voltage comparator circuit, the power supply noise needs to be reduced. Then, the power supplies therefore are separately generated using two regulator circuits VREG1, VREG2. Moreover, a regulator voltage monitoring circuit SV monitors the internal power supply voltages which VREG1, VREG2 generate, and outputs an internal power supply enable signal REGGD if these voltages are within a specified range.

A boot terminal BOOT supplies a power supply voltage of the driver circuit DV1. BOOT is coupled to the DRV5 via a Schottky diode SBD2, and also coupled to SW via an external boosting capacitor Cb and an external resistor Rb. When Ql is being turned on, the internal power supply voltage (DRV5) is applied to this Cb via SBD2 and BOOT. Thereafter, when Qh is turned on, Vin delivered to SW is boosted by this Cb and is then supplied to DV1. Accordingly, DV1 can generate a voltage no less than the threshold of Qh.

The control logic circuit LGC operates upon receipt of the PWM signal from the flip-flop circuit FFp, an ON/OFF signal from the device operation enable setting terminal (ON/OFF), an over-current detection signal OCP from an over-current detection circuit OCPC, and an over-voltage detection signal OVP from an over-voltage detection circuit OVPC, in addition to the above-described internal power supply enable signal REGGD. LGC controls DV1 and DV2 using the PWM signal when the ON/OFF signal (device operation enable signal) is being turned on (i.e., in the enabled state) and when all the REGGD, OCP, and OVP are normal.

To the device operation enable setting terminal (ON/OFF), an enable signal (not shown) is input from the outside and also a transistor Q20 is coupled. The transistor Q20 is driven to be turned on by a logical addition circuit OR20 when a temperature detection circuit TSD detects an abnormal heat generation, or when the over-voltage detection circuit OVPC detects the over-voltage detection signal OVP. In this case, the ON/OFF signal is forcibly turned off (i.e., the operation is disabled) regardless of the enable signal from the outside. The over-voltage detection circuit OVPC monitors the output power supply voltage Vout by the output power supply voltage detection terminal FB, and outputs OVP when an over-voltage occurs. The over-current detection circuit OCPC is coupled to CS via a comparator circuit VC3, and outputs OCP when an over-voltage occurs at CS (i.e., an over-current flows).

The pulse generation circuit PGEN outputs a reset signal RES and a max duty signal MXD upon receipt of the trigger input signal from the trigger input terminal TRG_IN. The reset signal RES serves as the reset input of the flip-flop circuit FFp, and MXD serves as the set input of FFp via a logical addition circuit OR1. Since the inductor L may be saturated to damage the device if the on-duty of the PWM signal is too high, MXD is a signal for forcing the PWM signal to fall in order to prevent this damage when the on-duty reaches the allowable maximum value. Moreover, the output of the comparator circuit VC1 is coupled to the other input of the logical addition circuit OR1. VC1 compares an error amplifier signal input from an error amplifier input terminal EO_IN with a signal of the voltage of CS added with a specified offset voltage (0.1 V).

Note that, the control logic circuit LGC forcibly drives Qh and Ql to be turned off when the over-current detection signal OCP or the over-voltage detection signal OVP is input. The output power supply voltage monitoring circuit PWGD detects that the output power supply voltage Vout detected at the output power supply voltage detection terminal FB is no less than a specified value. That is, it detects that the Vout generation operation is performed normally. If it detected, PWGD drives a transistor Q21 to output the detection signal to a power good terminal PG.

The error amplifier circuit EA generates the error amplifier signal by taking out a difference between the reference voltage Vref and the voltage at the output power supply voltage detection terminal FB, and then outputs it from an error amplifier output terminal EO. The output power supply voltage Vout of the output capacitor Cv is input to FB via a resistor voltage divider of external resistors R1, R2. Moreover, the bandwidth of the power supply circuit is set by an external resistor R4 and an external capacitor C2, and further, the error amplifier signal output from EO is fed back to EO_IN via a resistor voltage divider of external resistors R5, R6.

Moreover, EA is also coupled to a soft start terminal TRKSS. An external resistor R3, an external capacitor C1, and a transistor Q14 serving as a built-in transistor are coupled to TRKSS. Q14 drives TRKSS to the ground voltage GND via a logical addition circuit OR2 when the ON/OFF signal is in the OFF state (i.e., operation disabled state), or when the internal power supply enable signal REGGD is in the disabled state, or when the over-current detection signal OCP is activated. In this case, the output (EO) of EA becomes the GND level and the switching operation will stop. In contrast, when OCP is inactive, and the ON/OFF signal is in the ON state, and REGGD becomes in the enabled state, then Q14 is turned off and the charge will be stored in C1 from the internal power supply terminal REG5 via R3. In this way, the soft start is carried out, in which the voltage at TRKSS will rise slowly so as to increase the on-duty of the PWM signal slowly. A ground voltage terminal SGND, unlike PGND described above, is used for various control circuits that operate under the internal power supply (REG5).

Although the details will be described later, the timer circuit TM operates under the control of the ON/OFF signal and the internal power supply enable signal REGGD, and receives the trigger input signal from the trigger input terminal TRG_IN, and adds a specified delay time thereto and outputs it from the trigger output terminal TRG_OUT. The delay time in this case is set by an external capacitor Ctm and an external resistor Rtm coupled to the delay time setting terminal CT. Moreover, TM comprises the start trigger determining circuit STJG, wherein STJG generates a pulse signal only once at the beginning of the operation after power-on in the case where a resistor is coupled to TRG_OUT.

Figure 6:
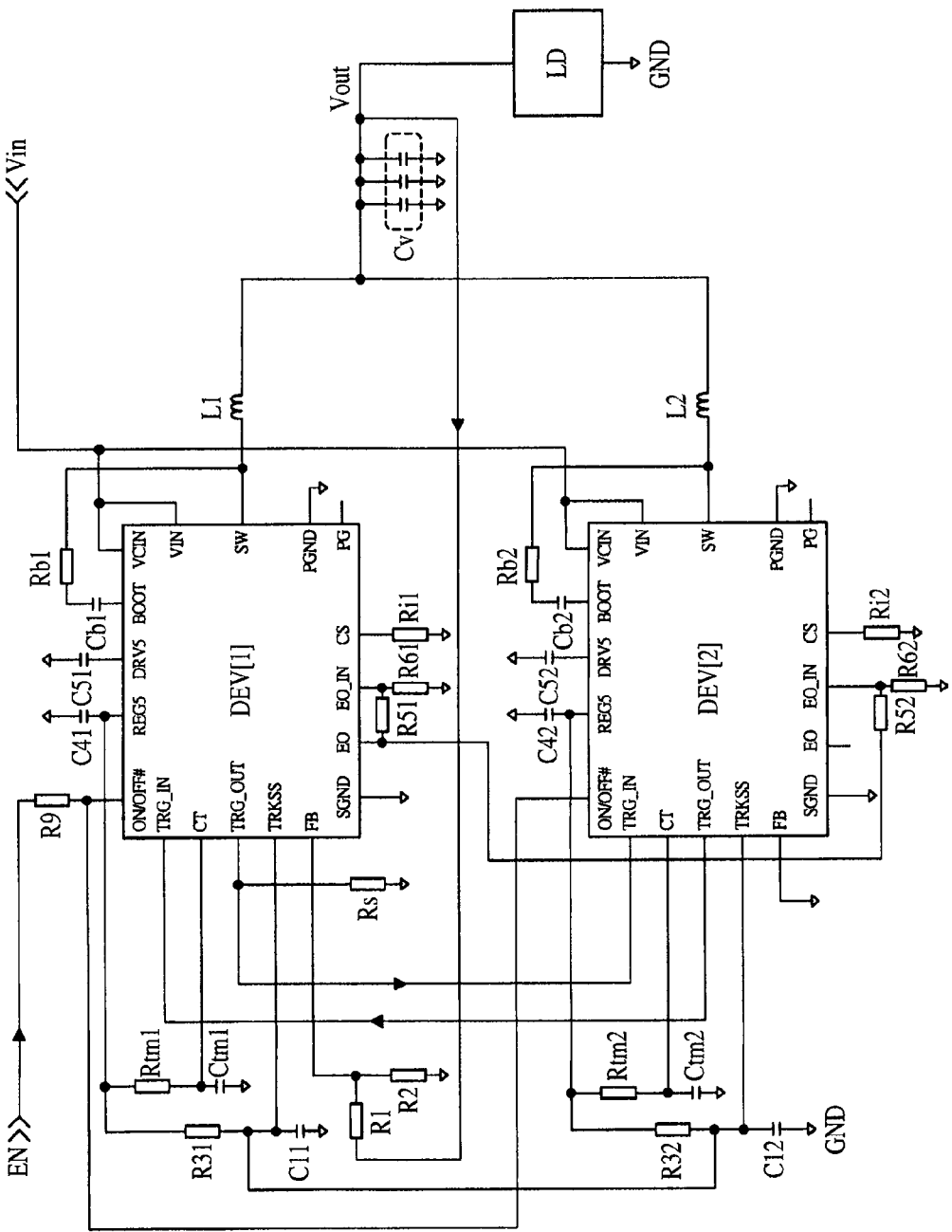
FIG. 6 is a wiring diagram showing a configuration example of a power supply unit when a multiphase power supply is realized using the semiconductor device of FIG. 4 and FIG. 5.

FIG. 6 is a wiring diagram showing a configuration example of a power supply unit in the case where a multiphase power supply is realized using the semiconductor device of FIG. 4 and FIG. 5. Although a power supply unit having two phases is taken as an example here, the power supply unit can be expanded to the one having no less than three phases in a similar manner, of course. The external resistor and external capacitor coupled to each of the external terminals of the semiconductor devices DEV[1], DEV[2] are mostly the same as those described in FIG. 4. Here, the description is made exclusively on the characteristic portions obtained by constructing the multiphase power supply.

First, TRG_OUT of DEV[1] is coupled to TRG_IN of DEV[2], and TRG_OUT of DEV[2] is coupled to TRG_IN of DEV[1], and whereby the multiphase power supply operation of two phases is performed as described above. That is, as described in FIG. 3, a current is supplied to the inductor L1 from SW of DEV[1] in a certain cycle, and then with a half cycle delayed therefrom a current is supplied to the inductor L2 from SW of DEV[2], and these currents are input to the output capacitor Cv, thereby generating the output power supply voltage Vout. Here, in order to generate the pulse signal only once at the beginning of the operation after power-on (i.e., during start-up or activation), the external resistor Rs is coupled between TRG_OUT of DEV[1] and the ground voltage GND. On the other hand, this external resistor is not coupled to TRG_OUT of DEV[2].

Vout is input to FB of DEV[1] via the resistor voltage divider of external resistors R1, R2. On the other hand, FB of DEV[2] is coupled to the ground voltage GND. That is, as described in FIG. 2, FIG. 3, DEV[1] generates an error amplifier signal corresponding to Vout, and this signal is shared by DEV[1] and DEV[2]. Specifically, EO of DEV[1] is coupled to EO_IN of DEV[1] via a resistor voltage divider of external resistors R51, R61 and at the same time is coupled to EO_IN of DEV[2] via a resistor voltage divider of external resistors R52, R62. Thus, an equalization of the current balance of each phase can be achieved as described in FIG. 2, FIG. 3. Note that, although EO of DEV[1] is coupled to EO_IN of DEV[2] via R52, R62 here, EO_IN of DEV[1] may be directly coupled to EO_IN of DEV[2].

The enable signal EN is commonly input to ON/OFF of DEV[1] and DEV[2] via an external resistor R9. Moreover, TRKSS of DEV[1] and TRKSS of DEV[2] are also coupled in common with each other. This allows the timings at the time of start-up and at the time of shutdown to be aligned between DEV[1] and DEV[2].

Figure 7B:
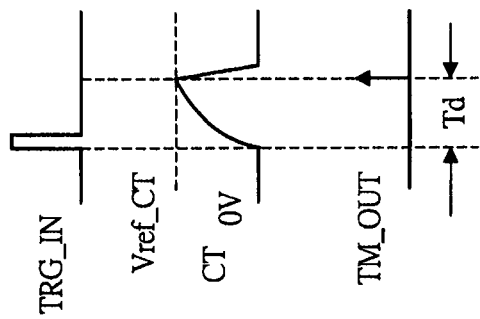
Figure 7A:
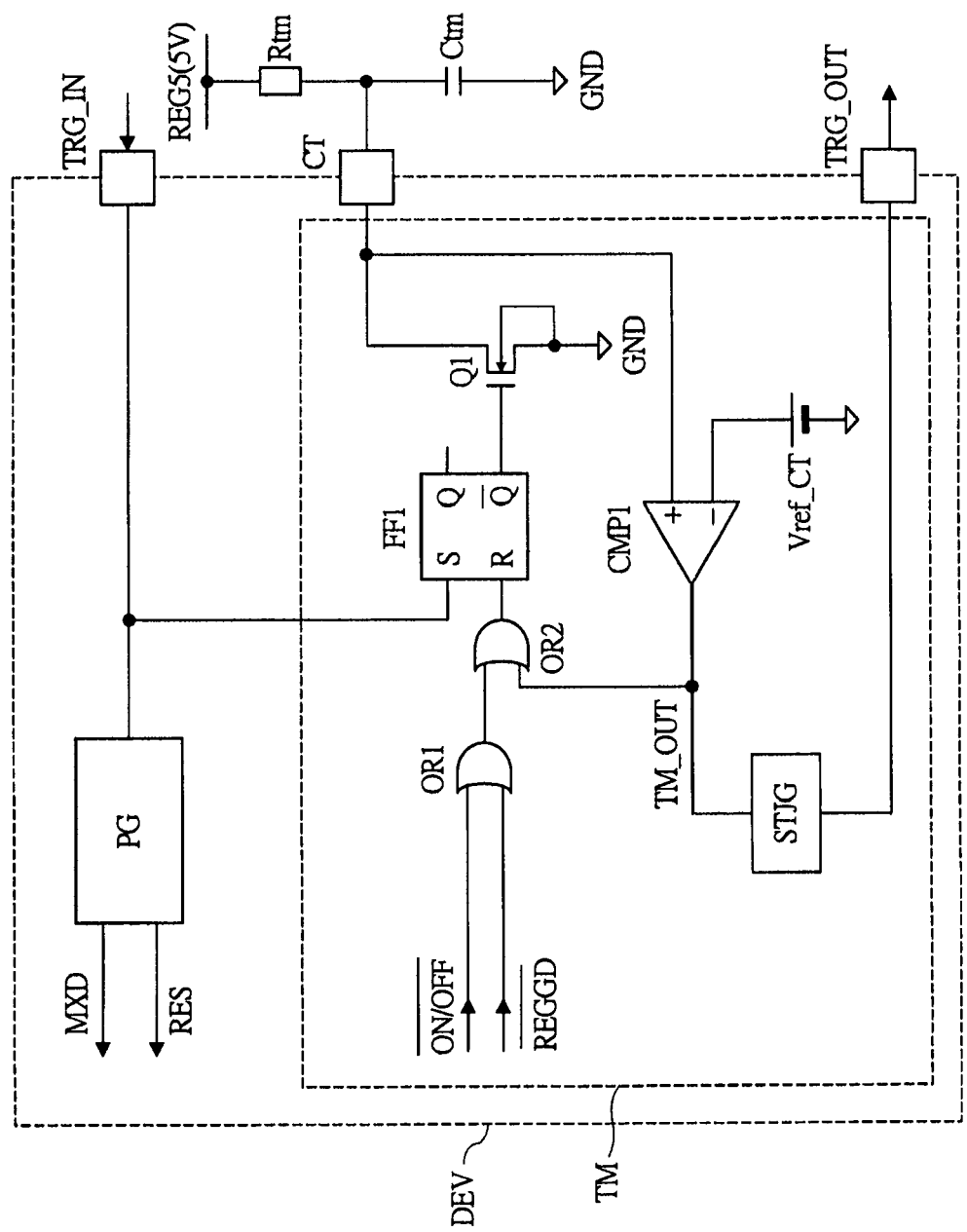

FIGS. 7(a) and 7(b) show the details of the timer circuit TM in the semiconductor device DEV of FIG. 4, wherein FIG. 7(a) is a circuit diagram showing a configuration example thereof and FIG. 7(b) is a waveform chart showing an operation example thereof. The timer circuit TM shown in FIG. 7(a) comprises a flip-flop circuit FF1, a transistor Q1, and logical addition circuits OR1, OR2, a comparator circuit CMP1, a start trigger determining circuit STJG, and the like. FF1 controls Q1 by an inverted output node (/Q), with TRG_IN serving as the set input and the output of OR2 serving as the reset input. On the other hand, the external resistor Rtm is coupled between the delay time setting terminal CT and the internal power supply voltage (REG5), and the external capacitor Ctm is coupled between CT and the ground voltage GND. Q1 is provided between this CT and the ground voltage GND.

That is, when a set input is provided to FF1, Q1 is turned off and the charge operation is performed to Ctm, while when a reset input is provided, Q1 is turned on and the discharge operation of Ctm is performed. The inversion signal of the ON/OFF signal and the inversion signal of REGGD are input to OR1, and this operation result is transmitted to the reset input of FF1 via one of the inputs of OR2. That is, in the operation disabled state or in the internal power supply disabled state, the reset input is provided, while otherwise, i.e., in the normal operation state, the reset input is not provided.

CMP1 compares the voltage of CT with a reference voltage Vref_CT, and generates a timer output signal TM_OUT if the voltage of CT becomes higher than Vref_CT. This TM_OUT is output to the start trigger determining circuit STJG, and also serves as the other input of OR2. Therefore, as shown in FIG. 7(b), upon receipt of a trigger input signal from TRG_IN, the charge operation with respect to Ctm is performed, and then when the voltage of CT reaches Vref_CT, the discharge operation is performed. Then, when the charge operation transitions to the discharge operation, TM_OUT is output. Here, time from the input to TRG_IN to the output of TM_OUT is the delay time Td of TM.

This delay time Td [sec] is given by Equation (1) using the capacitance value of Ctm, the resistance value of Rtm, and the voltage values of Vref_CT and REG5.

$$Td = -Ctm \cdot Rtm \cdot \text{Ln}\{1-(Vref\_CT)/REG5\} \quad (1)$$

Moreover, when the multiphase power supply operation as shown in FIG. 6 or the like is performed using such a timer circuit TM, the switching frequency f [Hz] is given by Equation (2).

$$f = (Td \times \text{number of phases})^{-1} \quad (2)$$

The switching frequency f is set to several hundreds of k [Hz], or the like, for example, although not limited thereto in particular. Once the switching frequency f is established, Td is established depending on the number of phases desired to realize, and then Ctm and Rtm for achieving this Td are determined. Note that, if there are variations in the accuracy of Ctm and Rtm, a shift in the phase difference between each phase will occur, however, for example, if the typically used Ctm and Rtm having the absolute accuracy of 1% or 2% are used, the problem will seldom occur in practical use.

Figure 8:
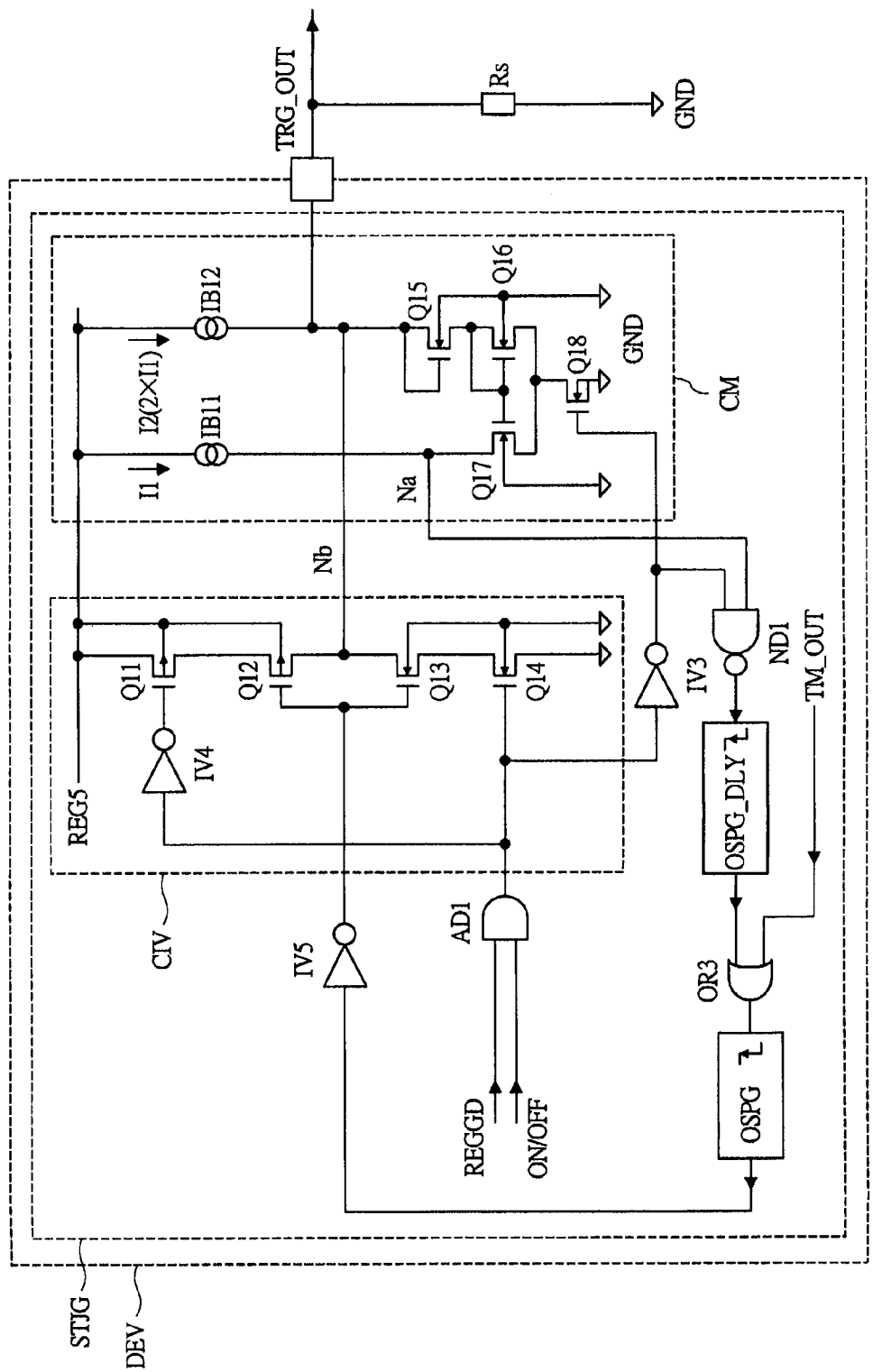
FIG. 8 is a circuit diagram showing a detailed configuration example of a start trigger determining circuit in the timer circuit of FIG. 7.

FIG. 8 is a circuit diagram showing a detailed configuration example of the start trigger determining circuit STJG in the timer circuit TM of FIG. 7. The start trigger determining circuit STJG shown in FIG. 8 comprises a clocked inverter circuit CIV, a current mirror circuit CM, inverter circuits IV3, IV5, a logical product circuit AD1, an inverted logical product circuit ND1, a one-shot pulse generation circuit OSPG, a one-shot delay pulse generation circuit OSPG_DLY, a logical addition circuit OR3, and the like. CIV includes PMOS transistors Q11, Q12 serially-coupled between the internal power supply (REG5) and an output node Nb, NMOS transistors Q13, Q14 serially-coupled between Nb and the ground voltage GND, and an inverter circuit IV4 coupled to the gate of Q11.

The current mirror circuit CM includes: a current source IB12 and NMOS transistors Q15, Q16 provided on one of current paths from the internal power supply (REG5) toward GND; a current source IB11 and an NMOS transistor Q17 provided on the other current path; and an NMOS transistor Q18 that controls activation/deactivation of CM. A current I2 from IB12 flows into a common source node through diode-connected Q15 and Q16, and further flows from here into GND through Q18. On the other hand, a current I1 from IB11 flows into a common source node through Q17, and further flows from here into GND through Q18. Q17, the gate and source of which are coupled to the gate and source of Q16 in common, respectively, has the same transistor size as that of Q16.

Both the output node Nb of CIV and the connection node between IB12 and Q15 in CM are coupled to TRG_OUT. AD1 receives the internal power supply enable signal REGGD and the ON/OFF signal (device operation enable signal), and drives Q11 and Q14 of CIV using this logical product result. This activates CIV when both the internal power supply and the device operation are in the enabled state, and deactivates CIV when either one of them is in the disabled state. Moreover, the output of AD1 is coupled to Q18 in CM via IV3. Accordingly, in contrast to CIV, CM is deactivated when both the internal power supply and the device operation are in the enabled state, and CM is activated when either one of them is in the disabled state.

ND1 receives the connection node Na between IB11 and Q17 in CM and the output of IV3 as the inputs thereof, and outputs the operation result of this inverted logical product to OSPG_DLY. Upon receipt of transition to 'H' level of ND1, OSPG_DLY generates a one-shot pulse signal, and also delays it by a fixed time (e.g., 10 µs) and outputs it to one of the inputs of OR3. The timer output signal TM_OUT described in FIG. 7 is input to the other input of OR3. OR3 outputs the operation result of logical addition of these inputs to OSPG. Upon receipt of transition to 'H' level of OR3, OSPG generates a one-shot pulse signal and transmits it to the gates of Q12 and Q13 in CIV via IV5.

In such a configuration, CIV functions as an output buffer and CM functions as a determination circuit to determine the presence or absence of connection of the external resistor Rs. Both the CIV and CM are coupled to TRG_OUT, however, since these operate in a complementary manner so that while one of them is activated the other may be deactivated, they will not affect each other. That is, while determination is being made by CM, CIV will not affect this determination operation, for example.

To specifically describe the operation, first, before startup, the ON/OFF signal is 'L' level and/or REGGD is 'L' level, so CIV is deactivated (Q11, Q14 are turned off) and CM is activated (Q18 is turned on). Then, one of the inputs (output of IV3) of ND1 becomes 'H' level. In such a state, if the external resistor Rs (e.g., 27 kO) is coupled to TRG_OUT, the current I2 (e.g., 10 µA) of IB12 flows to the Rs side and the applied voltages to Q15 and Q16 become no more than a threshold voltage and thus Q15 and Q16 are turned off. Accordingly, Q17 is turned off and the node Na becomes 'H' level. As a result, the output of ND1 becomes 'L' level. On the other hand, when the external resistor Rs is not coupled to TRG_OUT, the current I2 (e.g., 10 µA) of IB12 flows into Q15 and Q16. Accordingly, the current of I2 also flows in Q17, however, since the current of I2 is larger than the current I1 (e.g., 5 µA) of IB11, the node Na becomes 'L' level. As a result, the output of ND1 becomes 'H' level.

Thereafter, if the startup is carried out, the ON/OFF signal becomes 'H' level and also REGGD becomes 'H' level, and therefore, CIV is activated (Q11, Q14 are turned on) and CM is deactivated (Q18 is turned off). Accordingly, one of the inputs (output of IV3) of ND1 transitions to 'L' level from 'H' level. Here, if Rs is being coupled to TRG_OUT, then the output of ND1, upon receipt of the level transition to 'L' of one of the inputs, transitions to 'H' level from 'L' level. In contrast, if Rs is not being coupled to TRG_OUT, the output of ND1 remains 'H' level.

Therefore, only if Rs is coupled to TRG_OUT, OSPG_DLY outputs a one-shot pulse signal. This one-shot pulse signal is input to OSPG via OR3, and OSPG outputs a one-shot pulse signal again, and this signal is output to TRG_OUT via IV5 and the active CIV. Moreover, also when OR3 receives the timer output signal TM_OUT, OSPG outputs a one-shot pulse signal and this signal is output to TRG_OUT via IV5 and CIV. Note that, in the operation period after startup, since CM is inactive, CM will not affect this one-shot pulse signal. Further, in this operation period, regardless of the node Na in CM, the output of ND1 is fixed to 'H' level by the output of IV3, so OSPG_DLY will never operate again.

As described above, by using the timer circuit TM and the start trigger determining circuit STJG described in FIG. 7 and FIG. 8, each of the semiconductor devices can receive the trigger input signal from TRG_IN, and add the delay time Td thereto, and output the trigger output signal from TRG_OUT. Further, a semiconductor device having the external resistor Rs coupled to TRG_OUT can output the trigger output signal from TRG_OUT only once during the startup. Note that, in this case, for example in FIG. 6, DEV that starts the power supply switching operation first is DEV[2] that received TRG_OUT of DEV[1] during this startup, and subsequently DEV[1] will start the power supply switching operation.

Moreover, in summary, the configuration example of FIG. 7 comprises: a means (current mirror circuit CM) for determining whether or not the external resistor Rs is present; and means (ND1, OSPG_DLY, and the like) that reflects the transition of the startup signals (REGGD, ON/OFF) on the one-shot pulse signal generation circuit if it is present, and does not reflect the transition of the startup signals if it is not present. As long as the above-described means are included, various modifications can be made, not limited to the configuration example of FIG. 7, of course. Moreover, of course, such configuration can be made that determines based on the presence or absence of connection to TRG_IN, instead of determining based on the presence or absence of connection to TRG_OUT.

Furthermore, not limited to the determination based on the external resistor Rs, for example, such configuration may be made that determines based on whether the external terminal is set to the power supply voltage level or to the ground voltage level. However, in this case, one pin will be added to the external terminals, and therefore, from this viewpoint, a method of determining by the external resistor Rs is preferable. Since Rs has a high resistance of such as 27 kO, for example, it hardly affects the trigger output signal from TRG_OUT.

As described above, typically, a low cost multiphase power supply can be realized by using the power supply unit of Embodiment 2, as in the case of Embodiment 1.

Embodiment 3

Figure 9:
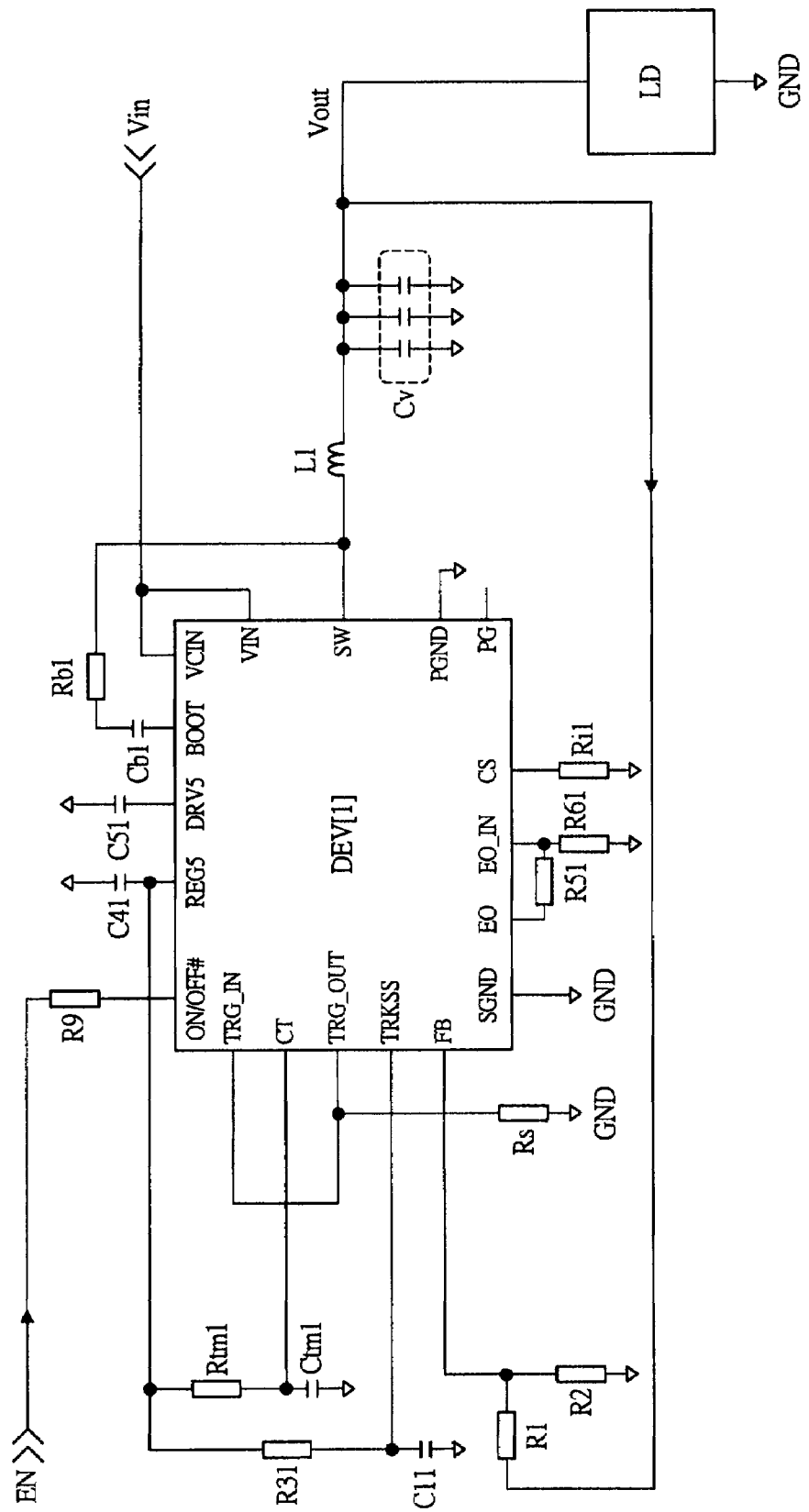
FIG. 9 is a wiring diagram showing a configuration example in a power supply unit according to Embodiment 3 of the present invention.

In Embodiment 3, an example is described, in which a single phase power supply is realized using the semiconductor device DEV described in Embodiment 2 (FIG. 4 or the like). FIG. 9 is a wiring diagram showing a configuration example in a power supply unit according to Embodiment 3 of the present invention. To the semiconductor device DEV [1] shown in FIG. 9, the same external resistors and external capacitors as those of DEV of FIG. 4 or DEV[1] of FIG. 6 are coupled. The difference is that the trigger output terminal TRG_OUT of DEV[1] is coupled to its own trigger input terminal TRG_IN, and the external resistor Rs is coupled to this TRG_OUT. Other than this, the configuration is the same as that of DEV of FIG. 4, or DEV[1] of FIG. 6, so the detailed description thereof is omitted.

Since the semiconductor device DEV described in FIG. 4 or the like does not require a master IC as in the prior art and shows a configuration example capable of operating by itself, it can operate as a single phase power supply by making connections as shown in FIG. 9. In this case, DEV[1] detects the external resistor Rs and generates the trigger output signal from TRG_OUT during startup, and starts the power supply switching operation when the trigger output signal is input to TRG_IN as the trigger input signal. The switching frequency f [Hz] when the configuration example of FIG. 9 is used is given by $f=(Td)^{-1}$ based on Equation (2) described above, where Td is the delay time from the trigger input signal to the trigger output signal.

In this way, if the semiconductor device DEV described in FIG. 4 or the like is used, then not only a multiphase power supply but also a single phase power supply can be realized easily and at low cost, and the flexibility in designing the power supply for a system can be increased. That is, power supplies having one to n phases can be realized by using one to n semiconductor devices.

Embodiment 4

FIGS. 10(a) and 10(b) show a basic concept of a power supply unit according to Embodiment 4 of the present invention, wherein FIG. 10(a) is a schematic diagram showing a configuration example thereof, and FIG. 10(b) is an explanatory view showing an operation example of FIG. 10(a). In the power supply unit shown in FIG. 10(a), a multiphase power supply having n phases is realized by coupling n semiconductor devices DEVd[1]-DEVd[n] in a ring shape, as in the power supply unit of FIG. 1. In the configuration example of FIG. 1(a), the interval of each phase is set in an analog manner using the timer circuit TM, while the configuration example of FIG. 10(a) has its main feature that the interval of each phase is digitally set using a reference clock signal.

In FIG. 10(a), a phase output terminal (phase output signal) PH_OUT[1] of DEVd[1] is coupled to a phase input terminal (phase input signal) PH_IN[2] of DEVd[2]. PH_OUT[2] of DEVd[2] is coupled to PH_IN[3] of DEVd[3], and the following DEVd's are coupled in the same manner. Then, PH_OUT[n] of DEVd[n] is coupled to PH_IN[1] of DEVd[1]. Here, as shown in FIG. 10(b), each of DEVd[1]-DEVd[n] generates such a phase output signal in synchronization with a reference clock signal SYNC. In this example, DEVd[n−1] generates PH_OUT[n−1] in synchronization with the falling edge of SYNC, and DEVd[n], which received this generated signal, starts a specified PWM operation (SW[n]) in synchronization with the next rising edge of SYNC and then generates PH_OUT[n] in synchronization with the next falling edge.

Here, this reference clock signal SYNC is generated by DEVd[1], in which a capacitor Cf is coupled to a frequency setting terminal CTF, and is output from a reference clock signal terminal SYNC[1] of DEVd[1]. On the other hand, CTF of each of DEVd[2]-DEVd[n] is set to the ground voltage. In this case, reference clock signal terminals SYNC[2]-SYNC[n] of DEVd[2]-DEVd[n] behave as an input terminal and receive the reference clock signal SYNC from DEVd[1], and whereby a common reference clock signal SYNC can be used among DEVd[1]-DEVd[n]. The behavior of such a reference clock signal terminal can be realized using a technique described in Patent Document 3.

Figure 11A:
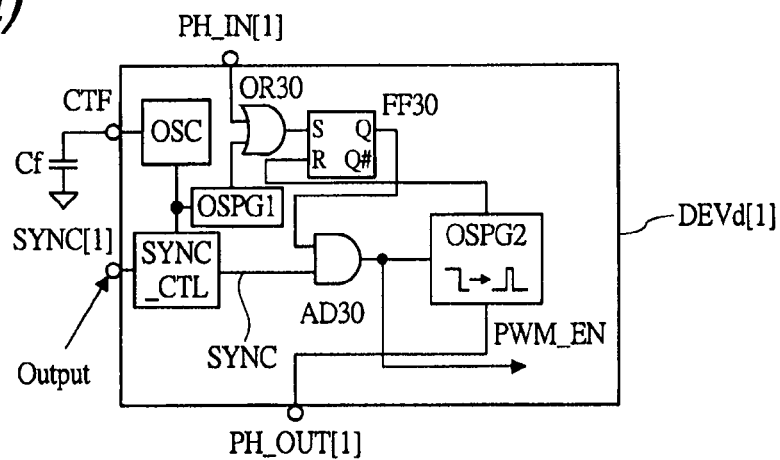
Figure 11B:
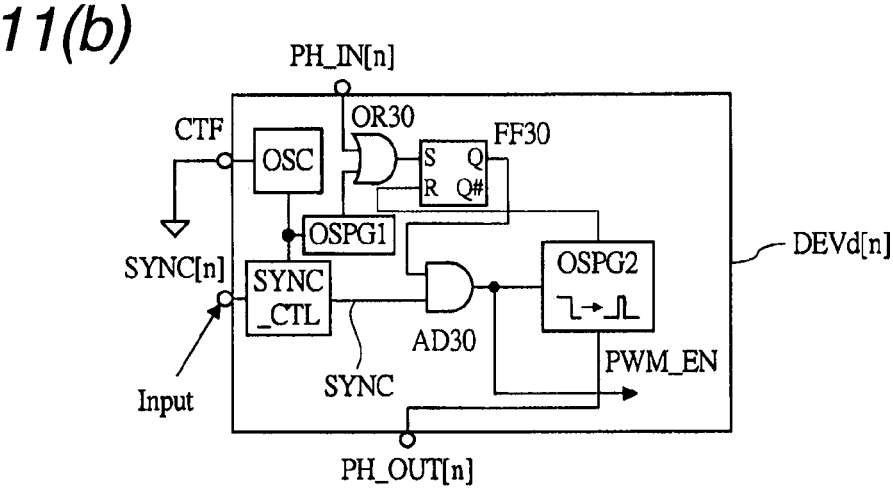
Figure 11C:
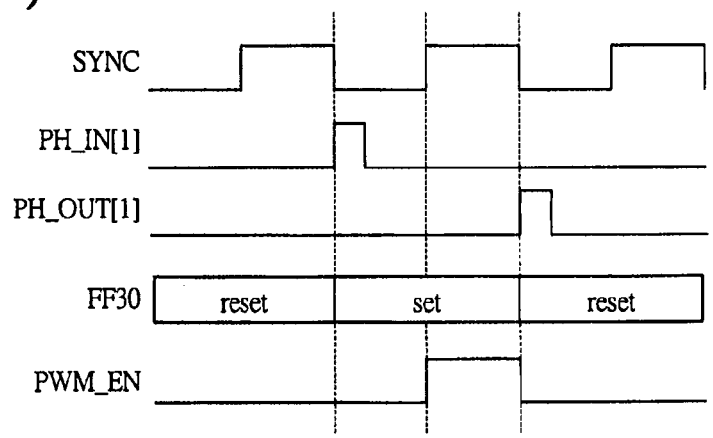

FIGS. 11(a) to 11(c) show an example around the phase input signal and the phase output signal in the semiconductor device of FIG. 10(a), wherein FIG. 11(a) is a schematic configuration diagram of a master device, FIG. 11(b) is a schematic configuration diagram of a slave device, and FIG. 11(c) is an explanatory view showing an operation example thereof. The semiconductor device DEVd[1] shown in FIG. 11(a) comprises an oscillator circuit OSC, a reference clock controller SYNC_CTL, a logical addition circuit OR30, a logical product circuit AD30, a flip-flop circuit FF30, one-shot pulse generation circuits OSPG1, OSPG2, and the like. This device is the master device for generating the reference clock signal as described in FIGS. 10(a) and 10(b).

OSC generates the reference clock signal SYNC at a frequency corresponding to the capacitor Cf coupled to the frequency setting terminal CTF. This SYNC is output from the reference clock signal terminal SYNC[1] via SYNC_CTL. The phase input terminal PH_IN[1] is coupled to the set input of FF30 via one of the inputs of OR30. Therefore, if the phase input signal is input, FF30 is set and the output (Q) thereof becomes 'H' level. The output (Q) of the FF30 is transmitted to one of the inputs of AD30. SYNC is transmitted to the other input of AD30. Therefore, if FF30 is set associated with the phase input signal, SYNC is output from AD30.

The output of this AD30 is input to OSPG2. Upon receipt of the falling edge of this SYNC, OSPG2 generates a one-shot pulse signal, and outputs it from PH_OUT[1] as the phase output signal. In this way, as shown in FIG. 11(c), upon receipt of the phase input signal synchronizing with the falling edge of SYNC from the preceding stage, OSPG2 will output the phase output signal at the next falling edge. On the other hand, the one-shot pulse signal of this OSPG2 serves as the reset input of FF30. As a result, as shown in FIG. 11(c), only one 'H' pulse signal in SYNC is output from AD30. The 'H' pulse signal from this AD30 is transmitted to the internal circuit as a PWM enable signal PWM_EN, and the internal circuit drives the transistors (i.e., Qh, Ql of FIG. 2) at a specified PWM duty in synchronization with this rising edge.

Moreover, the reference clock signal SYNC from OSC is also input to OSPG1. OSPG1 generates a start pulse signal only once when the reference clock signal SYNC from OSC becomes stable after startup of the device. This start pulse signal serves as the set input of FF30 via the other input of OR30. Then, as in the case of the phase input signal shown in FIG. 11(c), the phase output signal and the PWM_EN are generated. Note that, in this case, unlike the case of Embodiment 2, this master device will start the switching operation first. That is, in Embodiment 2, the master device generates the trigger output signal only once at the beginning, while in this Embodiment 4, the master device generates the trigger input signal only once at the beginning.

Moreover, the semiconductor device DEVd[n] shown in FIG. 11(b) also has the same configuration as that of DEVd[1] of FIG. 11(a). However, in DEVd[n], the frequency setting terminal CTF is set to the ground voltage GND, and therefore, the operation thereof slightly differs from that of DEVd[1]. That is, the reference clock signal terminal SYNC[n] of DEVd[n] behaves as an input terminal, and by the reference clock signal SYNC input from here, DEVd[n] performs the operation as shown in FIG. 11(c). In this case, since OSC is not operating and OSPG1 is also not operating, the start pulse signal will not be generated.

As described above, typically, a low cost multiphase power supply can be realized by using the power supply unit of Embodiment 4, as in the case of Embodiment 1 and the like. Moreover, since the multiphase power supply operation is performed in synchronization with the reference clock signal SYNC, the variation in phase difference between each phase can be reduced easily as compared with the case using the analog delay described in Embodiment 2 and the like.

Embodiment 5

Figure 12:
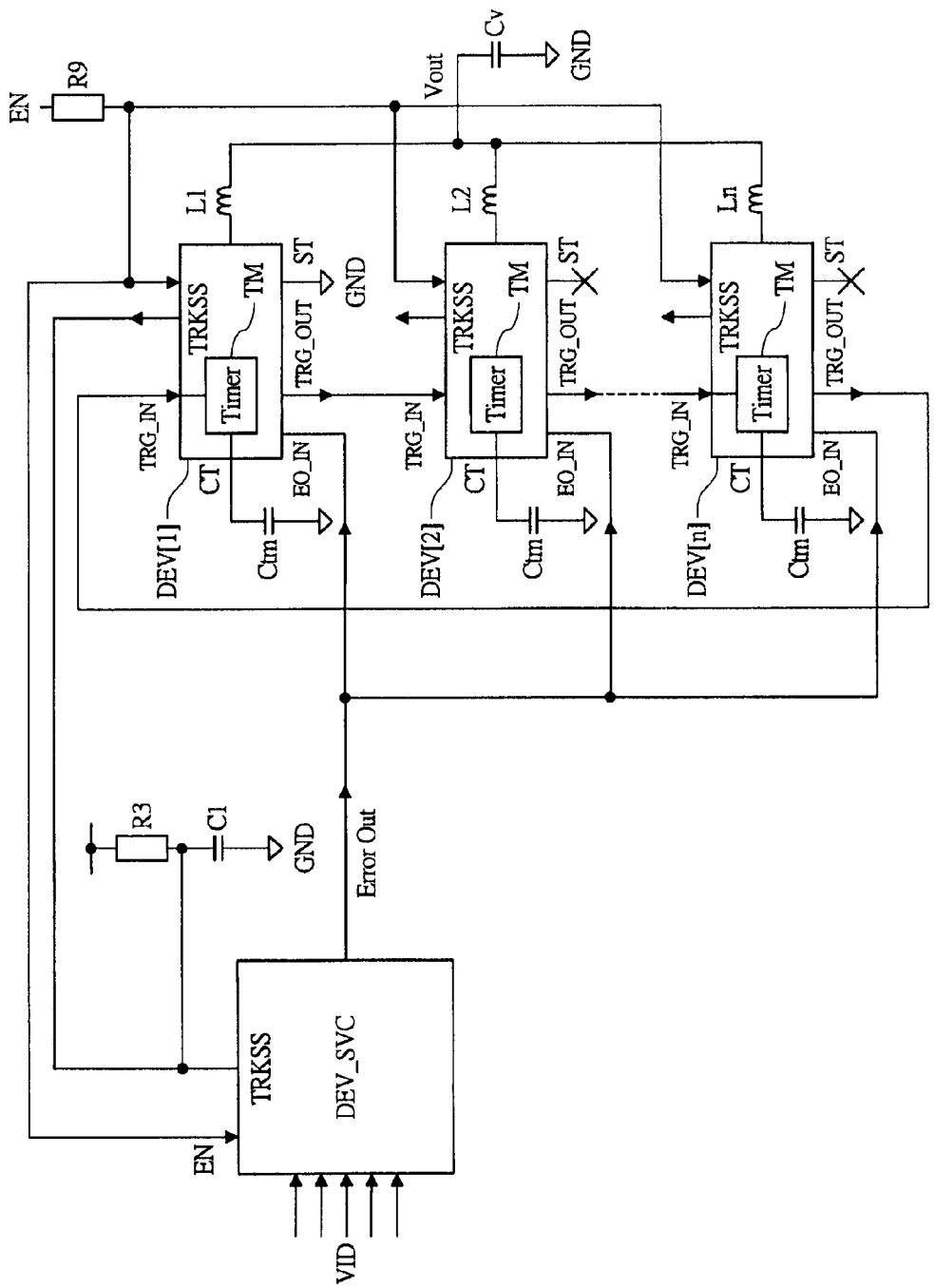
FIG. 12 is a schematic diagram showing an example of the configuration in a power supply unit according to Embodiment 5 of the present invention.

In Embodiment 5, an example of a power supply unit that uses the semiconductor device as described above and further expands the function is described. FIG. 12 is a schematic diagram showing an example of the configuration in a power supply unit according to Embodiment 5 of the present invention. The power supply unit shown in FIG. 12 is characterized by further comprising a monitoring and setting device DEV_SVC, for example, in addition to the n semiconductor devices DEV[1]-DEV[n] that are mutually ring-coupled as described in FIG. 1. Each of DEV[1]-DEV[n] has the configuration example of FIG. 4, for example.

The monitoring and setting device DEV_SVC, although the details thereof will be described later, comprises a function, which changes the determination level of the error amplifier mainly based on a plurality of output power supply voltage setting terminals VID and thereby sets the value of the output power supply voltage Vout at the output capacitor Cv. That is, for example, as shown in FIG. 6, in the embodiments described above, the configuration examples have been shown, in which the error amplifier signal (EO) from DEV[1] is shared at the error amplifier input terminals EO_IN of DEV[1]-DEV[n]. In contrast, in the configuration example of FIG. 12, an error amplifier signal from DEV_SVC is shared at the error amplifier input terminals EO_IN of DEV[1]-DEV[n].

Such an output power supply voltage setting terminal VID needs many pins, and therefore, if the same function is realized using the configuration examples (i.e., the power supply unit comprising only the same devices) of the above-described embodiments, this VID needs to be provided for all the devices. Then, by realizing this function with separate chip, as in the configuration example of FIG. 12, low cost as a whole can be achieved. In this case, at least an error amplifier is provided in DEV_SVC, so the error amplifier (EA in FIG. 4) in each of DEV[1]-DEV[n] may not be necessary. However, the error amplifier is preferably provided in DEV [1]-DEV[n] because EA does not require such a large area, and also in terms of maintaining the single operation function of DEV[1]-DEV[n].

Moreover, in the configuration example of FIG. 12, a soft start terminal TRKSS of the monitoring and setting device DEV_SVC is coupled to an external resistor R3, an external capacitor C1, and TRKSS of DEV[1]-DEV[n]. As shown in FIG. 4, this is for reflecting the information of the ON/OFF signal in DEV[1]-DEV[n], the internal power supply enable signal REGGD, and the over-current detection signal OCP on TRKSS of DEV_SVC.

Figure 13:
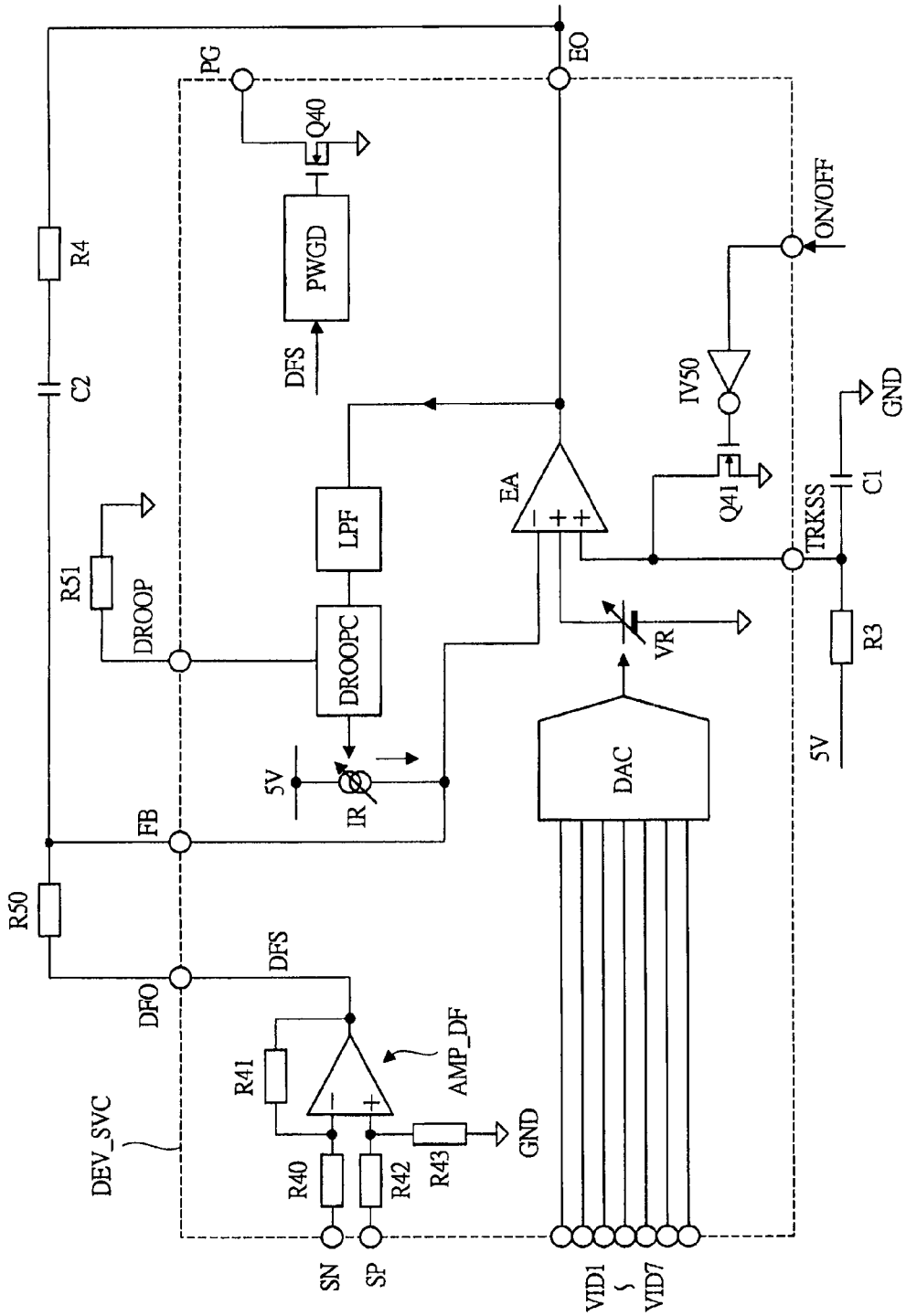
FIG. 13 is a block diagram showing a detailed configuration example of a monitoring and setting device in the power supply unit of FIG. 12.

FIG. 13 is a block diagram showing a detailed configuration example of the monitoring and setting device DEV_SVC in the power supply unit of FIG. 12. The monitoring and setting device DEV_SVC shown in FIG. 13 comprises: output power supply voltage detection terminals SN, SP, and FB; output power supply voltage setting terminals VID1-VID7; the soft start terminal TRKSS; a device operation enable setting terminal (ON/OFF); an error amplifier output terminal EO; a power good terminal PG; a droop terminal DROOP; a differential output terminal DFO; and the like.

SN is coupled, for example, to the ground voltage node of the load LD (not shown) coupled to the output capacitor Cv, and SP is coupled to the output power supply voltage Vout of Cv. A differential amplifier circuit AMP_DF amplifies a potential difference between SN and SP, and outputs this differentially amplified signal DFS to DFO. That is, more accurate voltage detection is carried out as compared with the case where voltage detection is carried out by FB as described in the above embodiments. This DFO is coupled to FB via an external resistor R50. A D/A conversion circuit DAC converts the output power supply voltage setting signals from VID1-VID7 into an analog value. A variable voltage generation circuit VR generates a voltage corresponding to this analog value, and outputs it to an error amplifier circuit EA.

The error amplifier circuit EA amplifies a potential difference between VR and FB, and outputs this result to EO. This allows EA to generate an error amplifier signal (EO) corresponding to VID1-VID7. Moreover, upon receipt of a voltage of TRKSS, to which an external resistor R3, an external capacitor C1, and a built-in transistor Q41 are coupled, EA carries out the soft start. When the ON/OFF signal of the device operation enable setting terminal (ON/OFF) is being turned off (in the operation disabled state), Q41 couples TRKSS to the ground voltage GND, and when the ON/OFF signal is turned on, TRKSS becomes in an opened state. When the ON/OFF signal is turned on, the voltage of TRKSS increases slowly and the soft start is carried out.

EO is coupled to FB via an external resistor R4 and an external capacitor C2. R4 and C2 assume the function to establish the bandwidth of the power supply circuit. Moreover, EO is coupled to EO_IN of DEV[1]-DEV[n], as shown in FIG. 12. On the other hand, the output (i.e., EO voltage) of EA is input to a droop control circuit DROOPC via a low pass filter circuit LPF. DROOPC controls a variable current source IR using the value of an external resistor R51 coupled to the droop terminal DROOP and the output voltage of EA. The current of this IR is supplied to FB. The output power supply voltage monitoring circuit PWGD detects that the voltage value of the differential amplifier signal DFS is no less than a specified value. That is, it detects that the output power supply voltage Vout generation operation is being carried out. If it detected, PWGD drives a transistor Q40 and outputs the detection signal to the power good terminal PG.

Here, the droop is known as the function that controls the output power supply voltage and the output power supply current in an inversely proportional manner, such that the output power supply voltage is reduced as the output power supply current increases, for example. In the peak current control method, the output voltage of the error amplifier circuit EA is proportional to the output power supply current. Therefore, the value of IR is varied in response to the output voltage of EA, and as a result, the output power supply voltage Vout can be varied. Specifically, the control is carried out so that the current value of IR may increase as the voltage of the error amplifier signal from EA increases. IR increases in proportion to the output (EO) of EA, and this proportional constant is determined by the value of the external resistor R51. Then, the value of a decrease in the output power supply voltage Vout in this case is expressed by Equation (3).

$$\Delta Vout = IR \times R51 \qquad (3)$$

As described above, typically, a low cost multiphase power supply can be realized by using the power supply unit of Embodiment 5, as in the case of Embodiment 1 and the like. That is, when you desire to add the droop function, the output power supply voltage setting function, or the like, a low cost multiphase power supply as a whole can be realized by providing these functions as a separate device. Specifically, for example, the monitoring and setting device DEV_SVC, as apparent from FIG. 13, can be realized with a small area, and moreover, there are less wiring between DEV_SVC and DEV [1]-DEV[n], and therefore, both the device cost and implementation cost can be reduced.

As described above, the invention made by the present inventor has been specifically described based on the embodiments, however, the present invention is not limited to the above-described embodiments, and various modifications can be made without departing from the scope of the invention.

For example, in the above-described embodiments, the configuration examples of the semiconductor device employing a peak current control method have been shown, however, the present embodiments are characterized in the method of realizing a multiphase power supply with a ring connection and are not necessarily limited to the peak current control method. For example, as widely known, the configuration using a voltage control method or the like that generates the PWM signal using a triangular waveform generation circuit are also possible. However, in the multiphase power supply, it is preferable to feed an equal current for each phase, and thus from this viewpoint, if the peak current control method is used, the control becomes easy.

Moreover, in the above-described embodiments, the configuration examples have been shown, in which the switching operation is performed using a trigger input signal as a starting point, however, not only the trigger input signal but also the trigger output signal may be a starting point, because in short, the switching operation just needs to be performed at a fixed interval.

The power supply unit according to an embodiment of the present invention is a useful technique in application to the multiphase DC-DC converter in particular, but not limited thereto, and can be widely applied to the power supply units in general.

What is claimed is:

1. A power supply unit, comprising: a plurality of semiconductor devices; a plurality of inductors coupled to the semiconductor devices, respectively; and an output capacitor commonly coupled to the inductors, each of the semiconductor devices including: a power supply input terminal to which an external power supply voltage is input; a ground voltage terminal to which a ground power supply voltage is input; a switch terminal coupled to an inductor corresponding to itself among the inductors; a first input terminal to which a first pulse input signal is input; a first circuit that receives the first pulse input signal, and generates a first pulse output signal after a first delay time has elapsed; a first output terminal that outputs the first pulse output signal; a transistor that couples the switch terminal to the power supply input terminal or the ground voltage terminal; and a control circuit that controls on/off of the transistor using the first pulse input signal as a starting point, wherein the semiconductor devices are mutually coupled in a ring shape with the first output terminal of itself being coupled to the first input terminal of any one of the semiconductor devices other than itself.

2. The power supply unit according to claim 1, wherein the first circuit further has a second circuit which, depending on setting from the outside, generates the first pulse input signal or the first pulse output signal only once during startup.

3. The power supply unit according to claim 2, wherein the second circuit determines whether or not to generate the first pulse input signal or the first pulse output signal depending on whether or not an external resistor is coupled to the first input terminal or the first output terminal.

4. The power supply unit according to claim 1, wherein each of the semiconductor devices further includes: a first detection terminal on which a voltage of the output capacitor is reflected; a second input terminal; and a second output terminal, wherein the control circuit has an error amplifier circuit that reflects a voltage of the first detection terminal and outputs an error amplifier signal for setting an on/off time of the transistor to the second output terminal, and wherein any one of the semiconductor devices generates the error amplifier signal by the error amplifier circuit, and the other semiconductor devices are configured so that the error amplifier signal generated by the any one of the semiconductor devices may be input from the second input terminal.

5. The power supply unit according to claim 4, wherein the control circuit further has: a current detection circuit that detects a current flowing through the transistor and converts it into a voltage; and a comparator circuit that compares the voltage converted by the current detection circuit with the error amplifier signal input from the second input terminal, and wherein the control circuit controls on/off of the transistor based on a comparison result of the comparator circuit.

6. The power supply unit according to claim 1, wherein the first circuit generates the first delay time by an analog circuit that uses a charge time to a capacitor.

7. The power supply unit according to claim 1, wherein the first circuit generates the first delay time by a digital circuit that uses an edge of a clock signal.

8. A power supply unit, comprising: a power supply input terminal to which an external power supply voltage is input; a ground voltage terminal to which a ground power supply voltage is input; a switch terminal coupled to an external output capacitor via an external inductor; a first input terminal to which a first pulse input signal is input; a first circuit that receives the first pulse input signal, and generates a first pulse output signal after a first delay time has elapsed; a first output terminal that outputs the first pulse output signal; a transistor that couples the switch terminal to the power supply input terminal or the ground voltage terminal; and a control circuit that controls on/off of the transistor by using the first pulse input signal as a starting point, wherein the first circuit further includes a second circuit which, depending on setting from the outside, generates the first pulse input signal or the first pulse output signal only once during startup.

9. The power supply unit according to claim 8, wherein the second circuit determines whether or not to generate the first pulse input signal or the first pulse output signal depending on whether or not an external resistor is coupled to the first input terminal or the first output terminal.

10. The power supply unit according to claim 8, further comprising: a first detection terminal on which a voltage of the external output capacitor is reflected; a second input terminal; and a second output terminal, wherein the control circuit includes an error amplifier circuit that reflects a voltage of the first detection terminal and outputs an error amplifier signal for setting an on/off time of the transistor to the second output terminal, and wherein the control circuit controls on/off of the transistor by the error amplifier signal output from the second output terminal being input from the second input terminal or by an error amplifier signal generated in other than itself being input from the second input terminal.

11. The power supply unit according to claim 10, wherein the control circuit includes: a current detection circuit that detects a current flowing through the transistor and converts it into a voltage; and a comparator circuit that compares the voltage converted by the current detection circuit with the error amplifier signal input from the second input terminal, and wherein the control circuit controls on/off of the transistor based on a comparison result of the comparator circuit.

12. The power supply unit according to claim 8, wherein the first circuit generates the first delay time by an analog circuit that uses a charge time to a capacitor.

13. The power supply unit according to claim 8, wherein the first circuit generates the first delay time by a digital circuit that uses an edge of a clock signal.

14. A power supply unit, comprising: a plurality of first semiconductor devices; a second semiconductor device; a plurality of inductors coupled to the first semiconductor devices, respectively; and an output capacitor commonly coupled to the inductors, each of the first semiconductor devices including: a power supply input terminal to which an external power supply voltage is input; a ground voltage terminal to which a ground power supply voltage is input; a switch terminal coupled to an inductor corresponding to itself among the inductors; a first input terminal to which a first pulse input signal is input; a first circuit that receives the first pulse input signal, and generates a first pulse output signal after a first delay time has elapsed; a first output terminal that outputs the first pulse output signal; a transistor that couples the switch terminal to the power supply input terminal or the ground voltage terminal; a second input terminal to which an error amplifier signal for setting an on/off time of the transistor is input; and a control circuit that controls on/off of the transistor based on the error amplifier signal by using the first pulse input signal as a starting point, wherein the second semiconductor device has: a plurality of first setting terminals for setting a voltage of the output capacitor; a first detection terminal on which a voltage of the output capacitor is reflected; a second output terminal; and an error amplifier circuit that reflects a voltage of the first detection terminal and information of the first setting terminal and outputs to the second output terminal an error amplifier signal for setting an on/off time of the transistor included in each of the first semiconductor devices, and wherein the first semiconductor devices are mutually coupled in a ring shape by the first output terminal of itself being coupled to the first input terminal of any one of the first semiconductor devices other than itself, and furthermore the second input terminals of the first semiconductor devices are coupled to the second output terminal of the second semiconductor device.

15. The power supply unit according to claim 14, wherein the first circuit further has a second circuit which, depending on setting from the outside, generates the first pulse input signal or the first pulse output signal only once during startup.

16. The power supply unit according to claim 15, wherein the second circuit determines whether or not to generate the first pulse input signal or the first pulse output signal depending on whether or not an external resistor is coupled to the first input terminal or the first output terminal.

17. The power supply unit according to claim 14, wherein the second semiconductor device further includes a droop function that controls currents flowing through the inductors and a voltage of the output capacitor so that they have an inversely proportional relationship.

* * * * *